United States Patent
Chua

(10) Patent No.: US 8,257,539 B2
(45) Date of Patent: Sep. 4, 2012

(54) DEVICE FOR TREATING PERISHABLE OBJECTS OR LIQUIDS AND METHOD OF FABRICATING THE DEVICE

(75) Inventor: Loh You Chua, Singapore (SG)

(73) Assignee: Esmo Technologies Pte. Ltd., Singapore (SG)

( * ) Notice: Subject to any disclaimer, the term of this patent is extended or adjusted under 35 U.S.C. 154(b) by 505 days.

(21) Appl. No.: 12/440,133

(22) PCT Filed: Sep. 5, 2007

(86) PCT No.: PCT/SG2007/000291
§ 371 (c)(1),
(2), (4) Date: Jun. 12, 2009

(87) PCT Pub. No.: WO2008/030191
PCT Pub. Date: Mar. 13, 2008

(65) Prior Publication Data
US 2010/0175567 A1 Jul. 15, 2010

(30) Foreign Application Priority Data

Sep. 8, 2006 (SG) ................................ 200606211-1

(51) Int. Cl.
*A23B 4/00* (2006.01)
*B23P 17/04* (2006.01)
(52) U.S. Cl. ............... 156/242; 99/485; 99/275; 29/428
(58) Field of Classification Search .................... 156/242
See application file for complete search history.

(56) References Cited

U.S. PATENT DOCUMENTS

| 3,935,355 | A | * | 1/1976 | Kuhn ............................ 403/267 |
| 4,237,518 | A | * | 12/1980 | Krulwich ...................... 361/267 |
| 4,821,914 | A | * | 4/1989 | Owen et al. ............. 220/592.21 |
| 5,527,105 | A | | 6/1996 | Riach |
| 5,705,215 | A | * | 1/1998 | Riach, Jr. ....................... 426/237 |
| 6,936,937 | B2 | * | 8/2005 | Tu et al. ...................... 310/12.12 |
| 2004/0172802 | A1 | * | 9/2004 | Crevier ........................... 29/408 |
| 2006/0232367 | A1 | * | 10/2006 | Shen ............................. 335/289 |
| 2007/0292571 | A1 | * | 12/2007 | Chua ............................ 426/237 |

FOREIGN PATENT DOCUMENTS

| DE | 10249913 A1 | 5/2004 |
| JP | 11-144945 A1 | 5/1999 |
| JP | 2001-172105 A1 | 6/2001 |
| WO | WO 2006/083232 A1 | 8/2006 |
| WO | WO 2006083232 A1 * | 8/2006 |

OTHER PUBLICATIONS

Supplementary European Search Report for International Application No. EP 07 80 8923, mailed May 19, 2011 (5 pages).

* cited by examiner

*Primary Examiner* — Philip Tucker
*Assistant Examiner* — Vicki Wu
(74) *Attorney, Agent, or Firm* — Harness, Dickey & Pierce, P.L.C.

(57) ABSTRACT

A device for treating perishable objects or liquids and a method of fabricating the device. The method comprising breaking a single piece of magnetic material into a plurality of pieces; inhibiting movement of the pieces with respect to each other during the breaking of the magnetic material; and forming a magnetic structure comprising the plurality of pieces of the magnetic material.

36 Claims, 23 Drawing Sheets

100

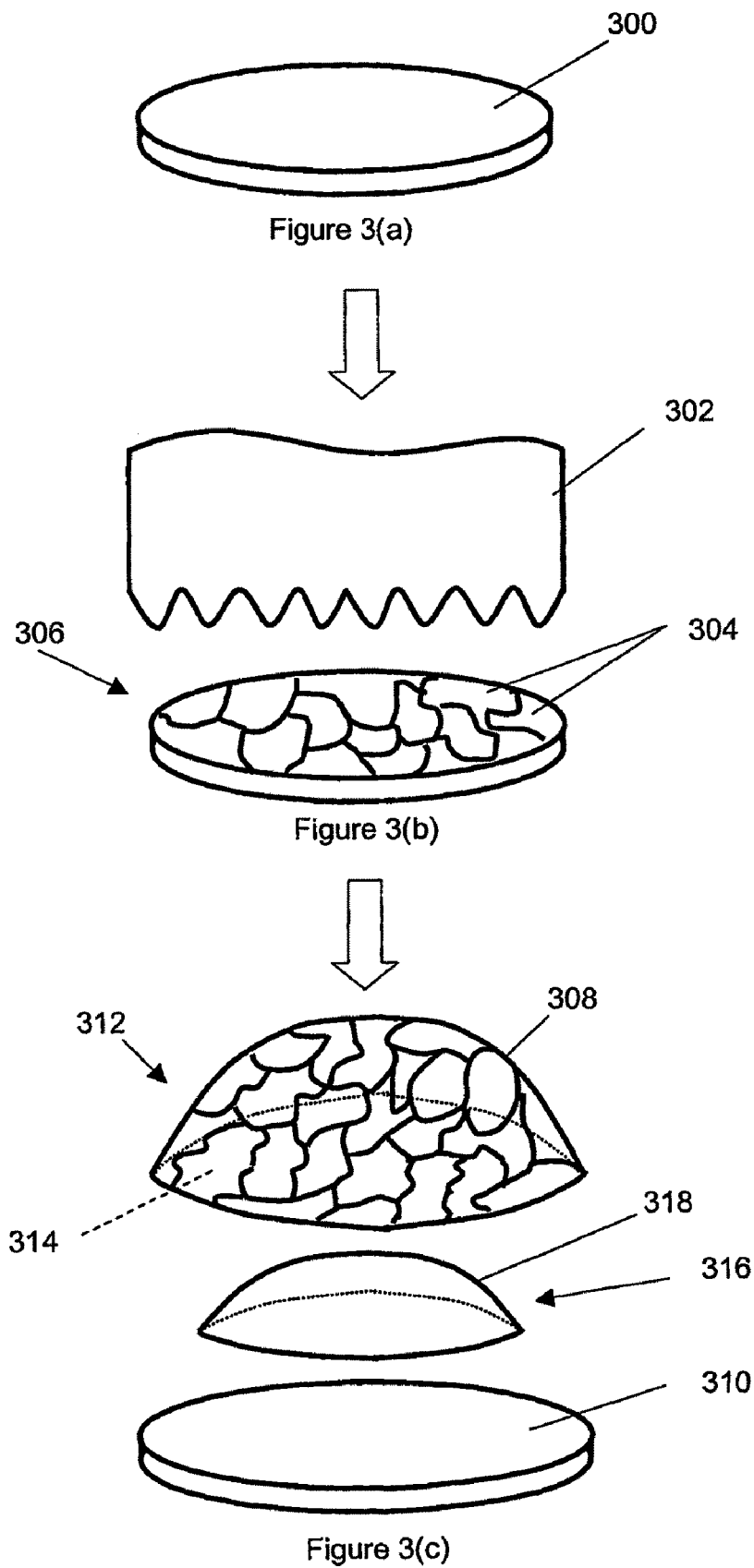

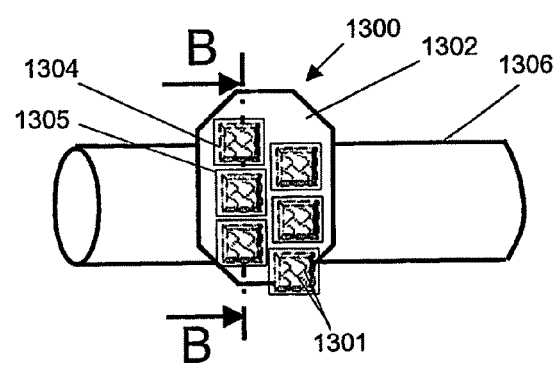
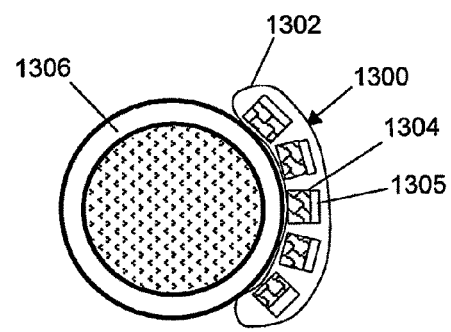
Figure 13(a)
Figure 13(b)
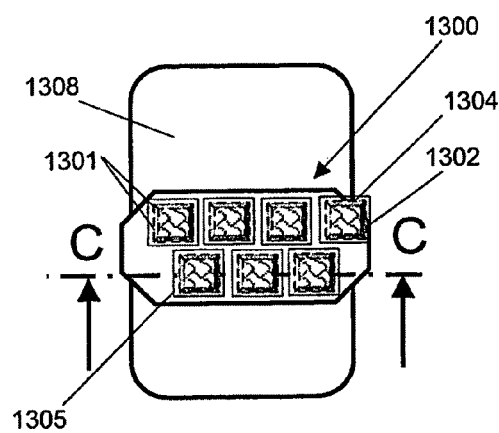
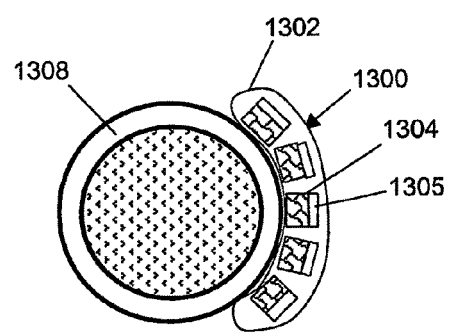
Figure 13(c)
Figure 13(d)

Average bacteria count
| Figure | | Magnetic strength of magnet B (gauss) | TPC (cfu/g) |
|---|---|---|---|
| 15b | With South magnetic interference | 150 ± 10 | 16,400 |
| 15c | W/O South magnetic interference | 150 ± 10 | 87,000 |
| 15d | Reference (no magnetic exposure) | 0 | 49,000 |
Figure 15(a)
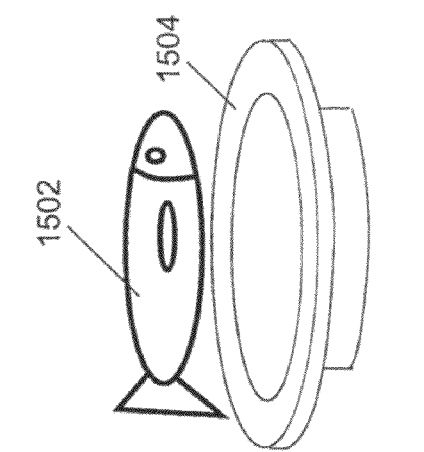
Figure 15(d)
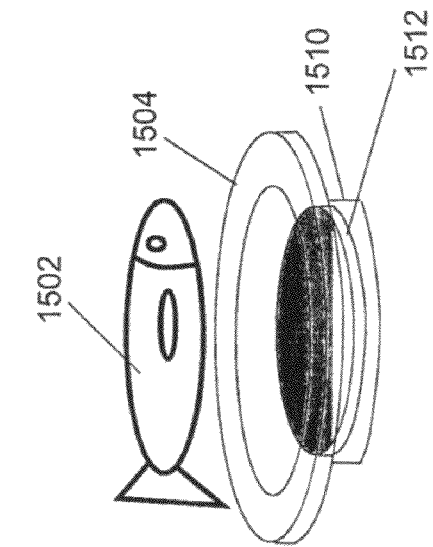
Figure 15(c)
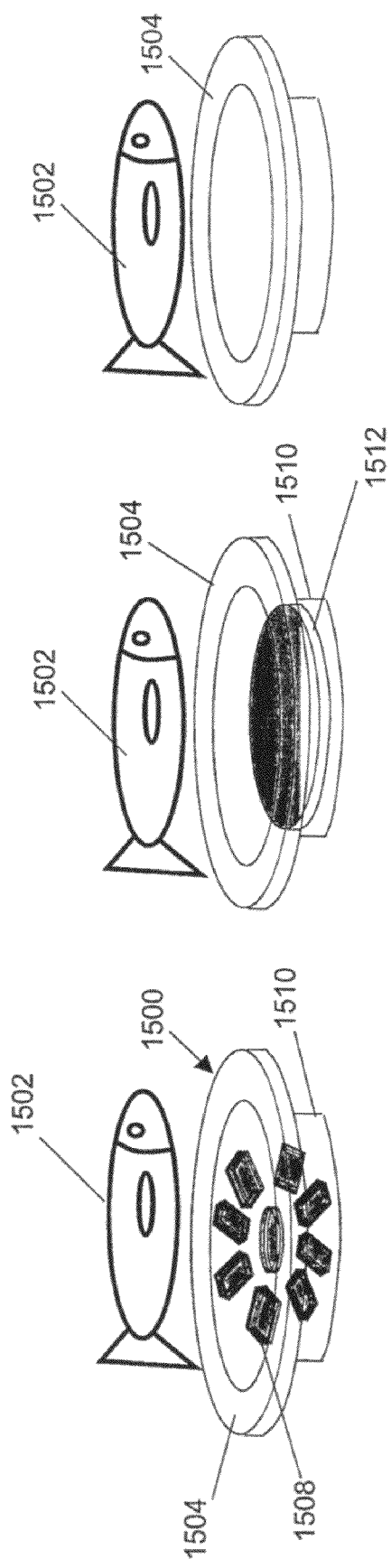
Figure 15(b)

DEVICE FOR TREATING PERISHABLE OBJECTS OR LIQUIDS AND METHOD OF FABRICATING THE DEVICE

CROSS-REFERENCE TO RELATED APPLICATIONS

This application is a 371 U.S. National Stage of International Application No. PCT/SG2007/000291, filed Sep. 5, 2007. This application claims the benefit of Singapore Patent Application No. SG 200606211-1, filed Sep. 8, 2006. The disclosures of the above applications are incorporated herein by reference.

FIELD OF INVENTION

The present invention relates broadly to a device for treating perishable objects or liquids and a method of fabricating the device.

BACKGROUND

Generally, perishable objects such as raw seafood, poultry, meats and dairy products deteriorate with time. One important factor affecting the rate of deterioration is water activity. Water activity affects the shelf life, safety, texture, flavour and smell of foods, as well as the stability of pharmaceuticals and cosmetics. In addition, water activity affects the activity of enzymes and vitamins in foods and the denaturing of fats and proteins, which in turn affects the colour, taste, and aroma of foods.

The water activity is a measure of the energy state of the water in a system. Some factors that affect water activity are water binding strength, dissociation of water, and solubility of solutes in water. Water activity also determines the lower limit of availability for microbial growth. The lower the water activity is or the higher the water binding strength is, the slower the deterioration of the food quality and bacteria growth is. Therefore, it is important to treat the perishable objects and the liquids to prolong the shelf life.

There are various known methods and devices to treat the perishable objects (e.g. cooked food, beverages, raw meat, etc.), to keep the perishable objects fresh. Some conventional devices utilise static magnetic fields to treat a perishable object, such as raw food and alcoholic beverage. These known devices typically use an array of permanent magnets that are arranged on a flat plane surface to perpendicularly project a magnetic field towards the object to be treated.

Some conventional devices utilise magnetic fields created by magnetic interference to treat perishable objects. Similarly, these known devices typically comprise a plurality of magnets arranged in a panel such that a magnetic field created by magnetic interference projects from the panel.

To treat a large object, such known devices may comprise several planes/panels of magnets and/or a large number of magnets in order to project a magnetic field that extends sufficiently to cover the object to be treated. However, having several planes/panels of magnets and/or a large number of magnets not only increases the weight and bulk of the device, the cost of manufacturing the device also increases. These disadvantages make the known devices not practical for commercial applications. Further, for a given size and weight, the magnetic field generated by the known devices may not be strong enough to effectively treat the perishable objects.

Therefore, there exists a need to provide a device for treating perishable objects or liquids and method of fabricating the device to address or overcome at least one of the above problems.

SUMMARY

In accordance with a first aspect of the present invention, there is provided a method of fabricating a device for treating perishable objects or liquids, the method comprising: breaking a single piece of magnetic material into a plurality of pieces; inhibiting movement of the pieces with respect to each other during the breaking of the magnetic material; and forming a magnetic structure comprising the pieces of the magnetic material.

Inhibiting movement of the pieces may comprise providing a fixture element on the magnetic material prior to breaking the magnetic material.

The fixture element may comprise at least one adhesive sheet attached along at least one surface of the magnetic material.

The fixture element may comprise two adhesive sheets attached along opposing surfaces of the magnetic material.

The adhesive sheet may be an elastic plastic sheet.

The elastic plastic sheet may be wound around the opposing surfaces of the magnetic material.

The method may further comprise: forming the magnetic structure into a desired shape while substantially maintaining a relative position of the pieces of the magnetic material with respect to each other.

The pieces of the magnetic material may be initially unpolarized and may be magnetically polarized after the desired shape of the magnetic structure is formed.

Forming the magnetic structure into the desired shape may comprise: providing a support having a profile with the desired shape; attaching the magnetic structure to the support such that a shape of the magnetic structure conforms to the shape of the profile.

Attaching the magnetic structure to the support may comprise wrapping the magnetic structure against the support with an adhesive sheet.

The desired shape of the magnetic structure may be dome-shaped or arc-shaped.

The magnetic structure may be substantially globe-shaped and may comprise two dome-shaped or arc-shaped magnetic structures having opposite polarity.

The magnetic structure may be substantially planar.

The magnetic structure may comprise at least two dome-shaped or arc-shaped magnetic structures having a same polarity stacked on one another.

The method may further comprise providing a shield element for shielding a north pole side or a south pole side of the magnetic structure.

The shield element may comprise at least one auxiliary magnet formed of a single piece of magnetic material.

The auxiliary magnet may be a permanent magnet or may comprise magnetic material.

The method may further comprise: disposing a plurality of the magnetic structures on a non-planar support structure of a desired shape.

The support structure may be dome-shaped.

The method may further comprise providing an additional shield element on a concave side of the support structure.

The additional shield element may be made from metal.

The additional shield element may comprise a single piece of magnetic material.

The method may further comprise encapsulating the device in plastic resins or in a plastic casing.

In accordance with a second aspect of the present invention, there is provided a device for treating perishable objects or liquids, the device comprising: a plurality of pieces formed from a single piece of magnetic material wherein movement of the pieces of the magnetic material with respect to each other is inhibited.

The device may further comprise a fixture element in contact with the pieces of the magnetic materials for inhibiting movement of the pieces with respect to each other.

The fixture element may comprise at least one adhesive sheet.

The fixture element may comprise two adhesive sheets attached along opposing surfaces of the magnet elements.

The adhesive sheet may be an elastic plastic sheet.

The elastic sheet may be wound around the opposing surfaces of the magnetic material.

The magnet elements may form a substantially planar magnetic structure.

The pieces of the magnetic material may form a dome-shaped or arc-shaped magnetic structure.

At least two dome-shaped or arc-shaped magnetic structures having a same polarity may be stacked on one another.

Two dome-shaped or arc-shaped magnetic structures may form a substantially globe-shaped magnetic structure, the two dome-shaped or arc-shaped magnetic structures having opposite polarity.

The device may further comprise a support having a profile with a desired shape, wherein the magnetic structure is attached to the support to conform a shape of the magnetic structure to the shape of the profile.

The magnetic structure may be attached to the support with an adhesive sheet that wraps the magnetic structure against the profile of the support.

The desired shape may be an arc-shape or a dome-shape.

The support may be made of plastic.

The device may further comprise a shield element for shielding a north pole side or a south pole side of the magnet elements.

The shield element may comprise at least one auxiliary magnet formed of a single piece of magnetic material.

The auxiliary magnet may be a permanent magnet or may comprise magnetic material.

The device may further comprise: sets of pieces formed from respective single pieces of magnetic material, the sets being disposed on a non-planar support structure of a desired shape.

The support structure may be dome-shaped.

The device may further comprise an additional shield element disposed on a concave side of the support structure.

The additional shield element may be made from metal.

The additional shield element may comprise a single piece of magnetic material.

The device may be encapsulated in plastic resins or in a plastic casing.

The device may further comprise a fastening means for fastening the device around a component used for containing the perishable object.

The device may be provided separately for use in treating perishable objects.

The device may further comprise a flexible support structure for carrying one or more sets of pieces formed from respective single pieces of magnetic material for attaching the device to objects with curved surfaces.

The objects with curved surfaces may comprise a conduit or a container.

The sets of pieces of the magnetic material may be arranged in a substantially staggered arrangement.

The device may be incorporated into a tray, a plate, a container, a pendant or a coaster.

The device may be mounted in a liquid enclosure or a liquid tank.

BRIEF DESCRIPTION OF THE DRAWINGS

Embodiments of the invention will be better understood and readily apparent to one of ordinary skill in the art from the following written description, by way of example only, and in conjunction with the drawings, in which:

FIGS. 3(a) to 3(c) are schematic drawings showing another example method of fabricating a device according to another embodiment;

FIG. 13(a) is a schematic drawing of a device according to another embodiment wrapped around a conduit structure;

FIG. 13(b) is a schematic drawing of a cross-section of the device of FIG. 13(a) along line B-B;

FIG. 13(c) is a schematic drawing of a device according to another embodiment wrapped around a cylindrical portion of a container;

FIG. 13(d) is a schematic drawing of a cross-section of the device of FIG. 13(c) along line C-C;

FIG. 15(a) is a table based on experimental results showing the average total bacteria count in three samples (FIGS.

Figure 16:
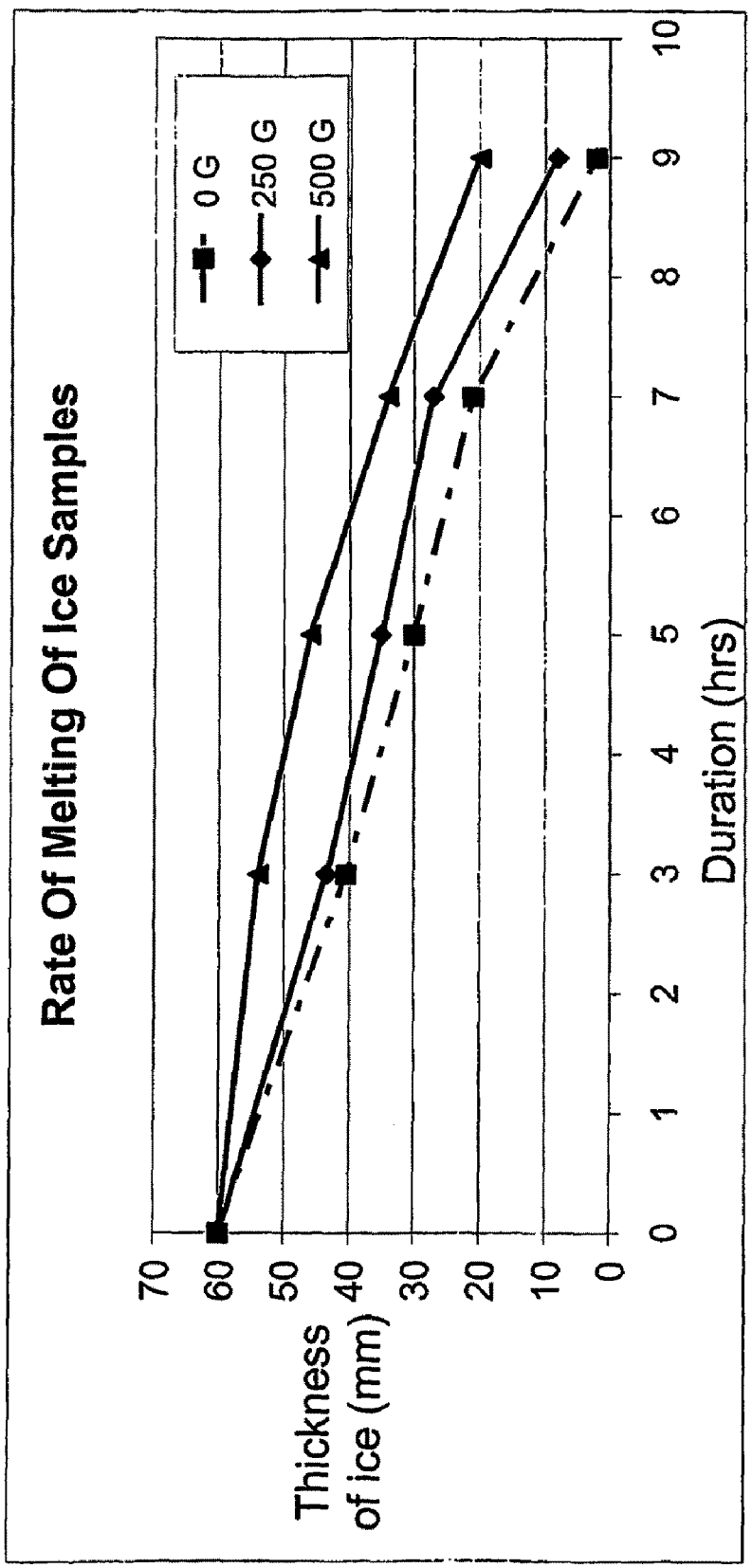
Figure 17:
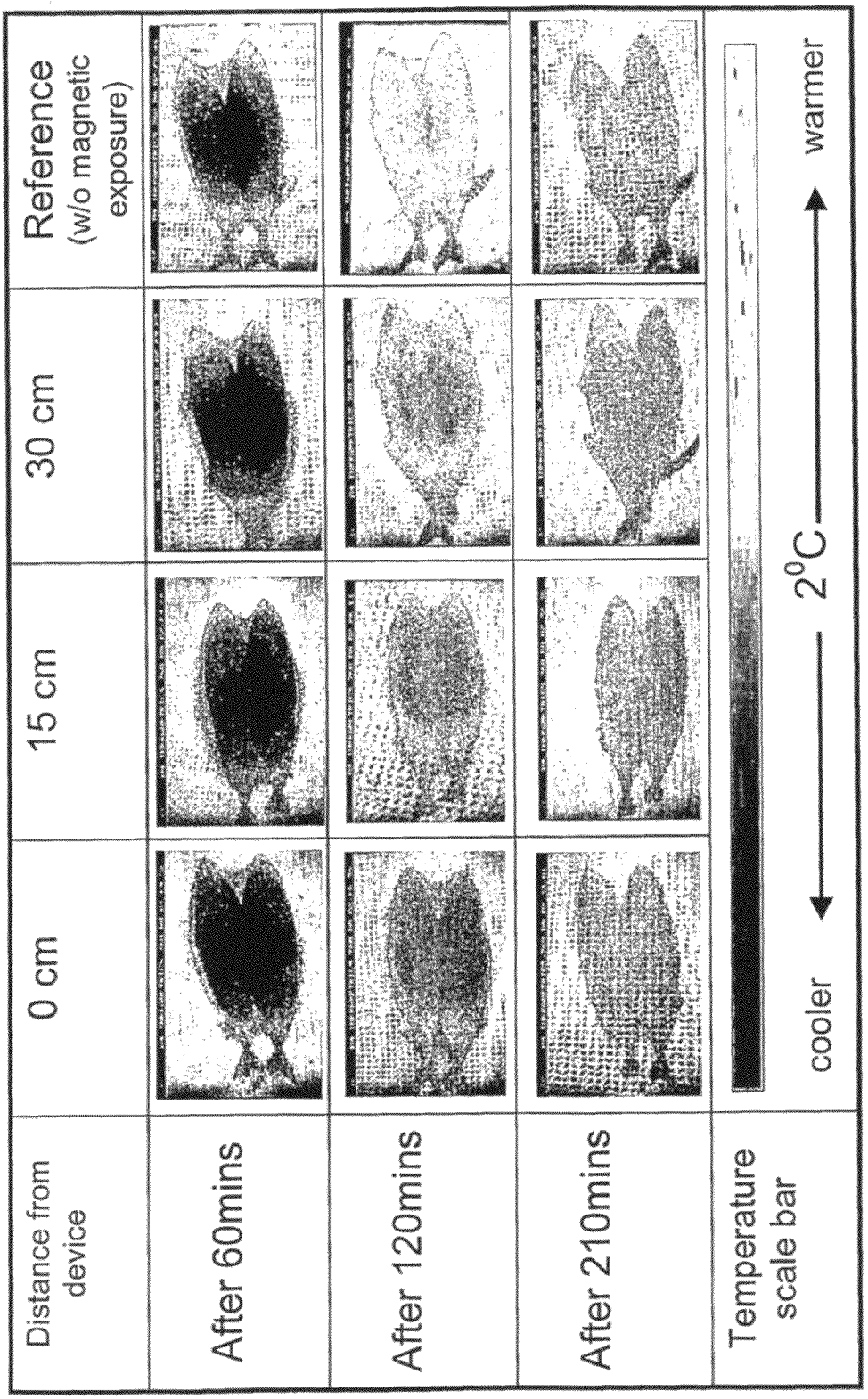
Figures 18A, 18B:
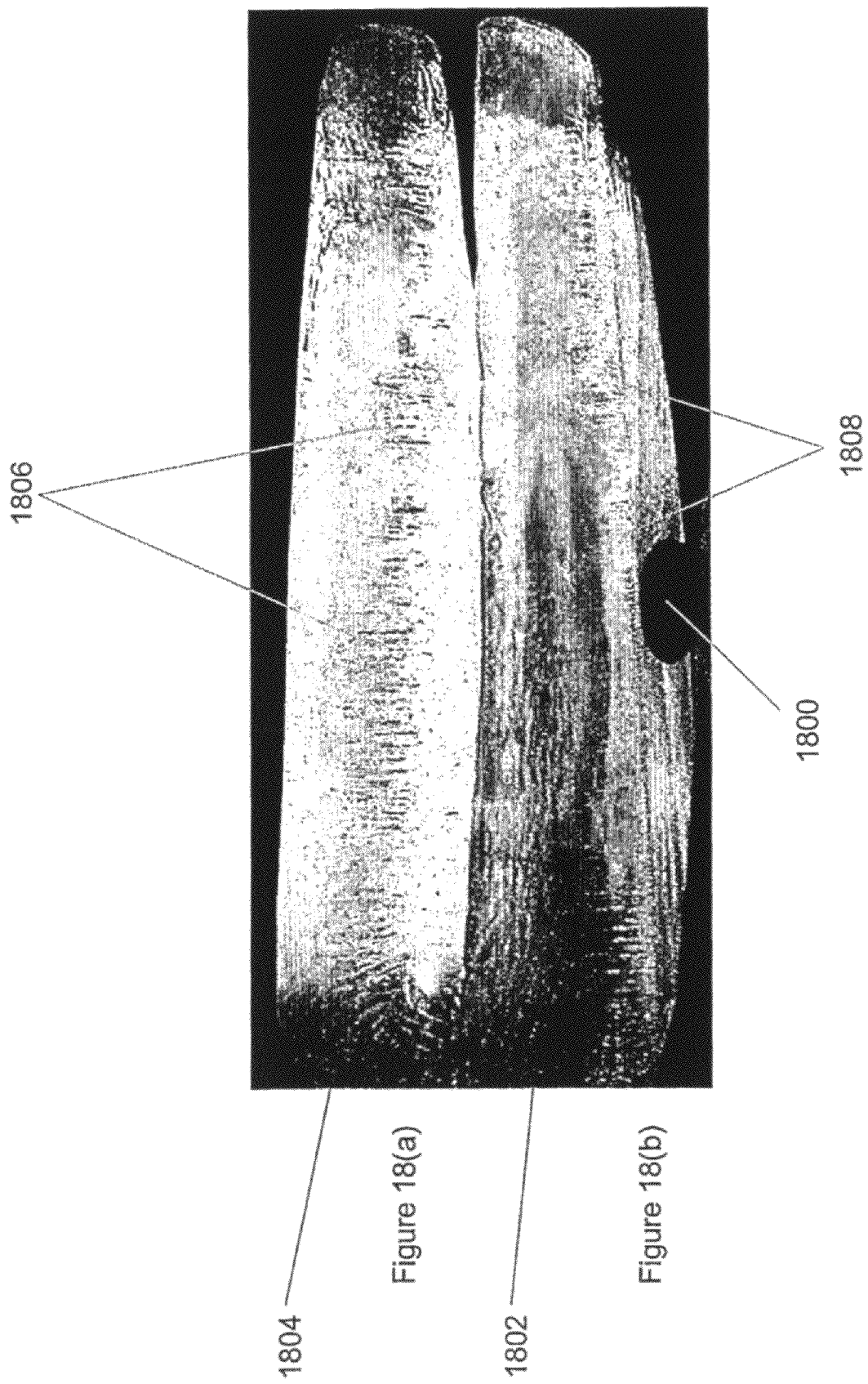
Figure 19A:
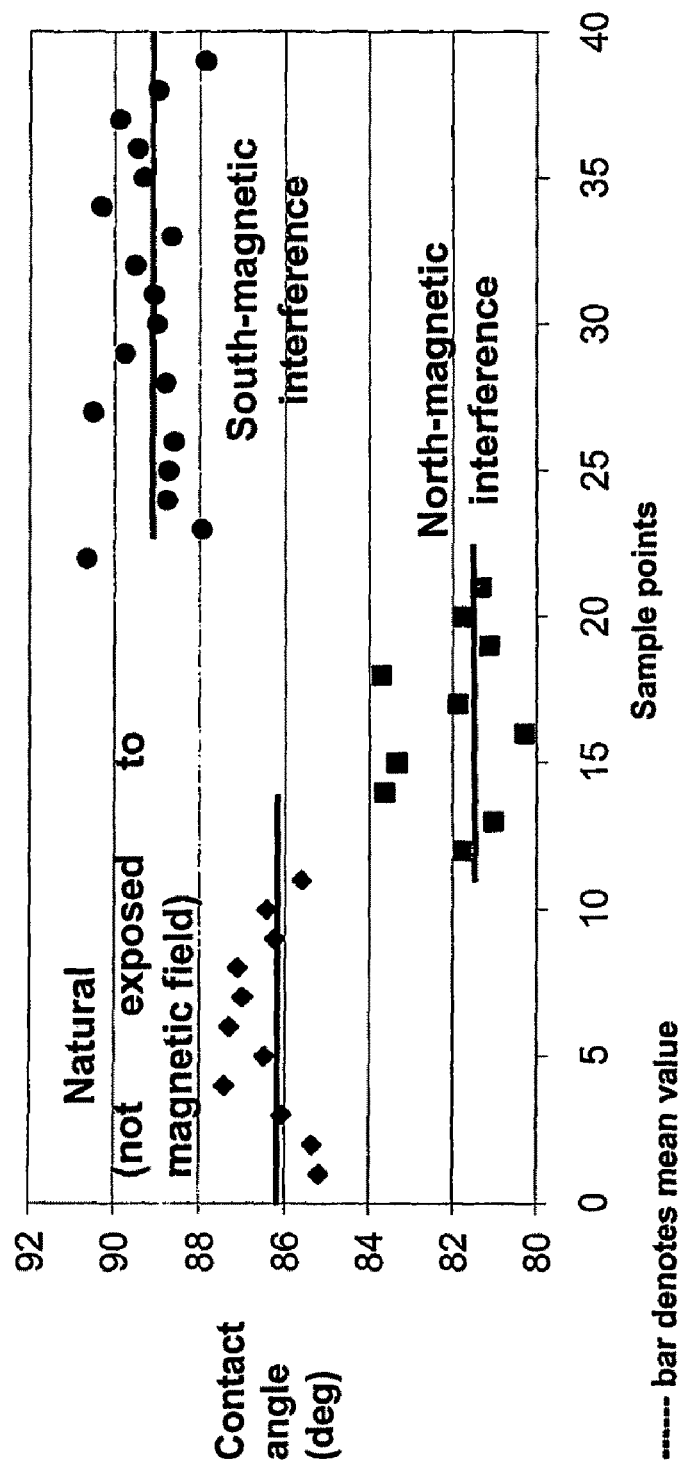
Figure 19B:
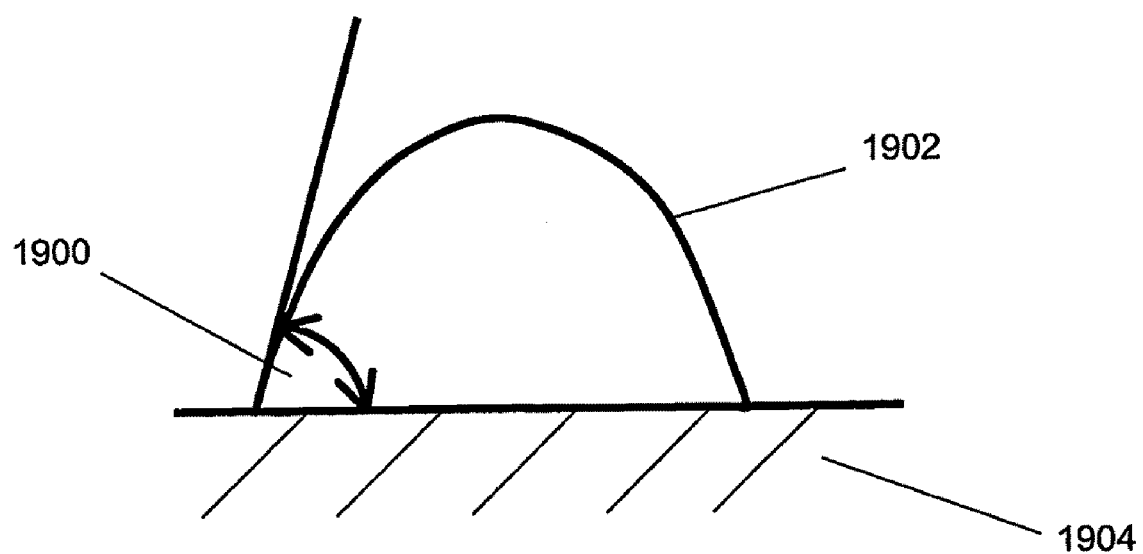
Figure 20:
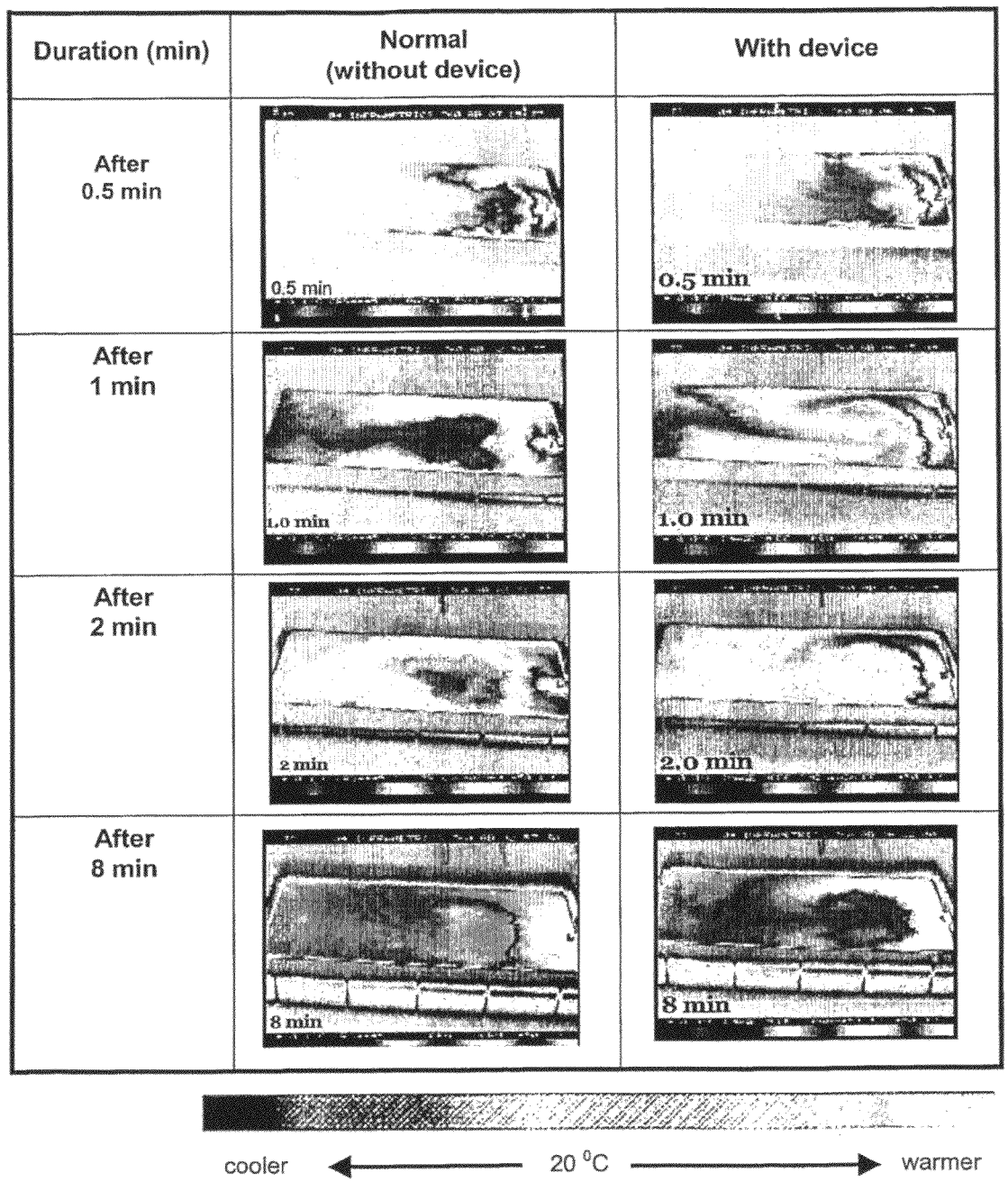
Figure 21:
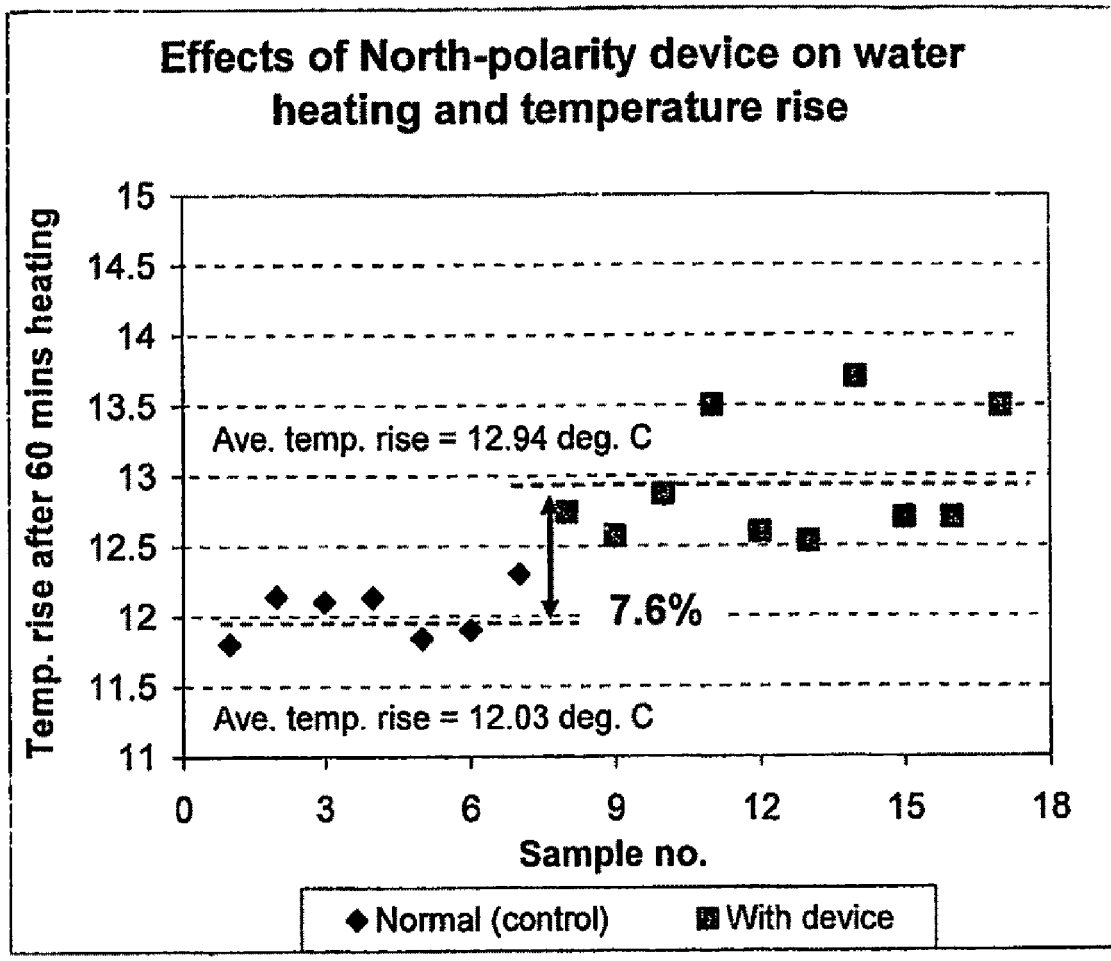
Figure 22:
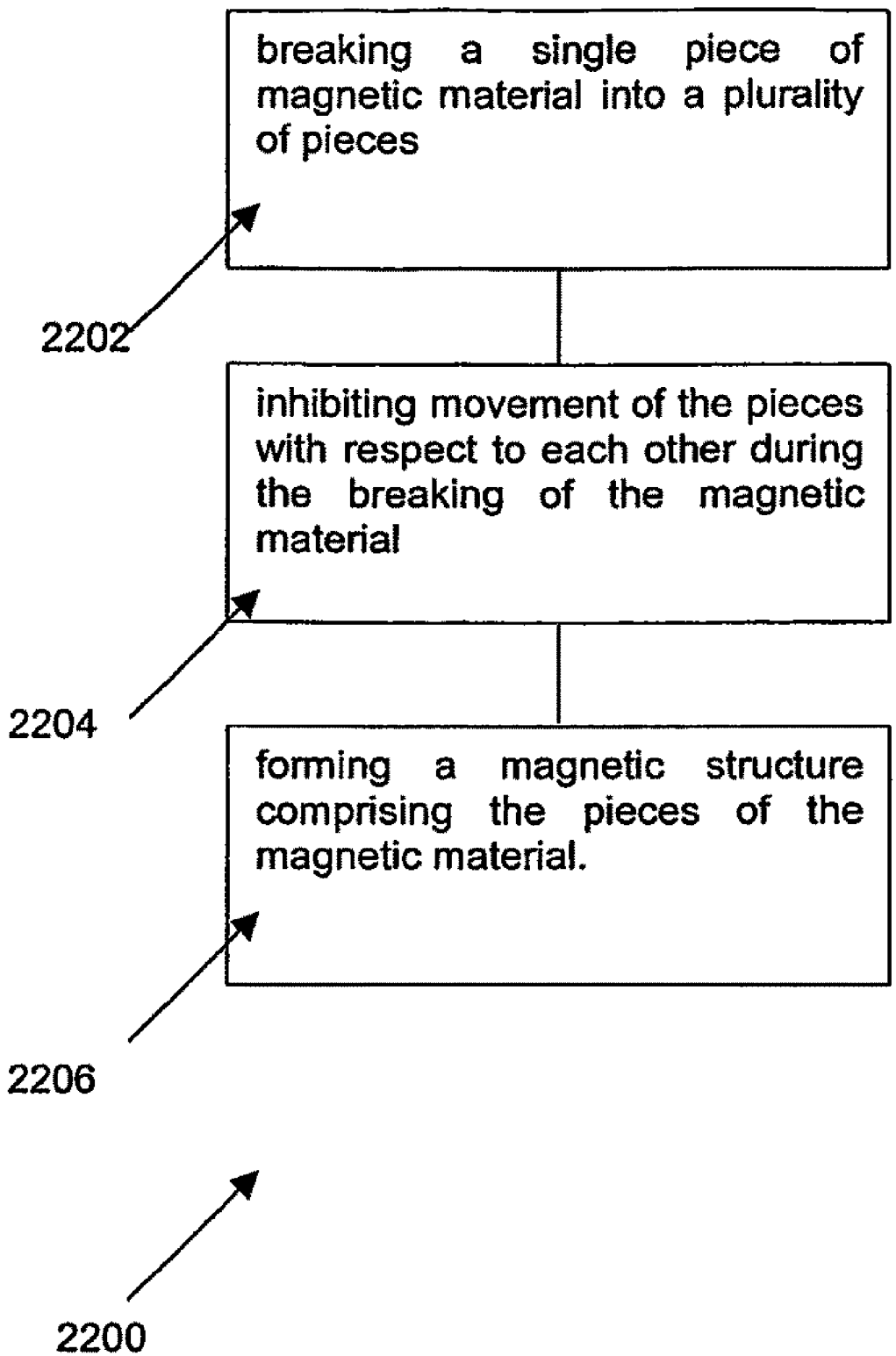

15(b)-15(d)) of raw sliced salmon after an exposure period of about 4.5 hours in room conditions at about 20° C.;

FIG. 16 is a graph based on experimental results of ice bed thickness against duration of melting ice;

FIG. 17 is a graph based on experimental results showing thermal images of raw whole fish exposed to the device and raw whole fish not exposed to the device, respectively;

FIGS. 18(a) and 18(b) are photographs of a block of ice exposed to the device and another block of ice not exposed to the device, respectively;

FIG. 19(a) is a graph based on experimental results demonstrating the effects of magnetic interference on water surface energy when a plurality of sessile water droplets are exposed to a magnetically interfered south magnetic field, a magnetically interfered north magnetic field and without any magnetic field, respectively;

FIG. 19(b) is a schematic drawing showing a contact angle of a sessile water droplet;

FIG. 20 is a table based on experimental results showing thermal images of water in a storage tank exposed to the device during a boiling process and water in another storage tank which is not exposed to the device, respectively;

FIG. 21 is a graph based on experimental results of water temperature rise after 60 minutes heating in a 153 litres of water in a water storage tank exposed to the device and water in another storage tank not exposed to the device, respectively; and FIG. 22 shows a flowchart illustrating a method of fabricating the device for treating perishable objects or liquids according to the embodiments.

DETAILED DESCRIPTION

Figure 1A:
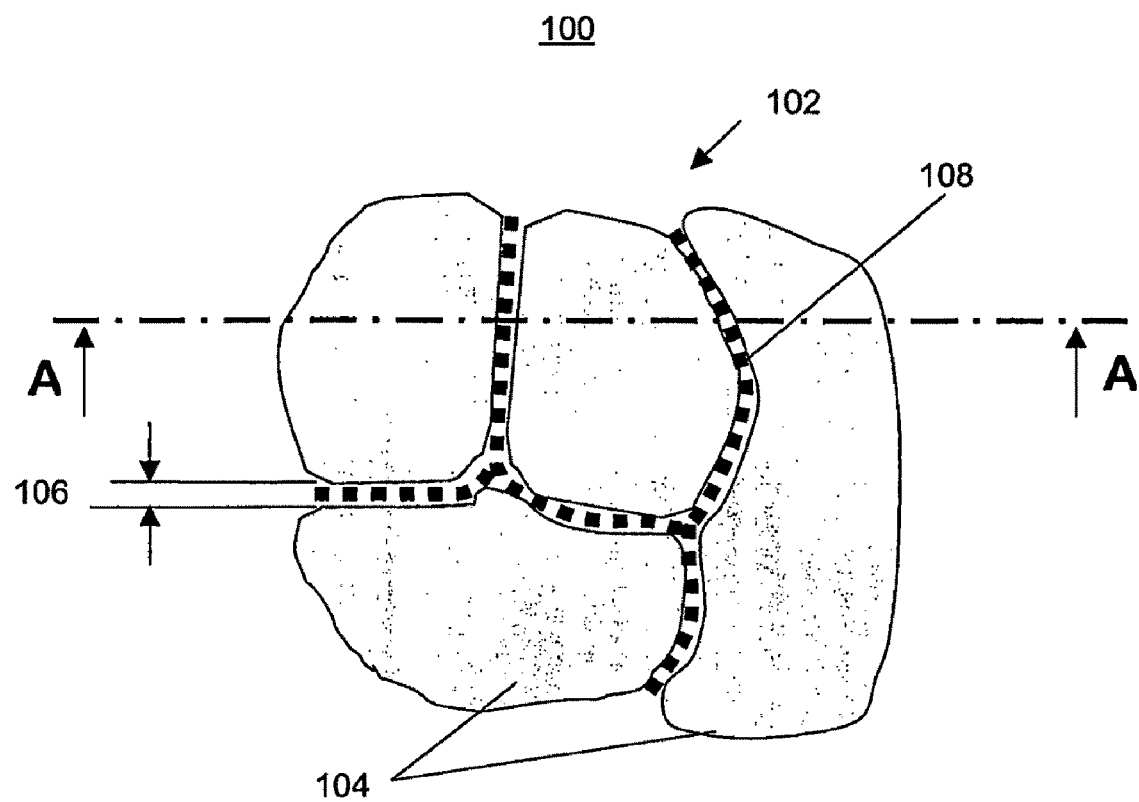
FIG. 1(a) is a schematic drawing of a plan view of a portion of a device according to an embodiment.

A schematic drawing of a portion of a device 100 for treating perishable objects, is shown in FIG. 1(a). The relative, dimensions of the various features of the device 100 have been exaggerated for illustration purposes. The device 100 generally comprises a magnetic structure 102 comprising a plurality of magnet elements 104 formed from a single piece of magnetic material (not shown) and movement of the magnet elements 104 with respect to each other is inhibited. The plurality of magnet elements 104 are spaced adjacent each other with a gap 106 defining a boundary 108 between adjoining magnet elements 104 to produce a magnetic field created by magnetic interference of the magnet elements 104. The size of the gap 106 between the magnet elements 104 can range from about 0.05 mm to about 3.00 mm.

The magnetic field created by magnetic interference can be directed onto a perishable object (not shown) to treat the perishable object. Magnetic interference of the magnet elements 104 enhances the strength of the magnetic field projected from the plurality of magnet elements 104. Therefore, the greater the intensity of the magnetic interference, the greater the enhancement of the magnetic field strength. To treat the perishable object, the magnetic field created by magnetic interference of the magnet elements 104 is directed upon the object to be treated.

Figure 1B:
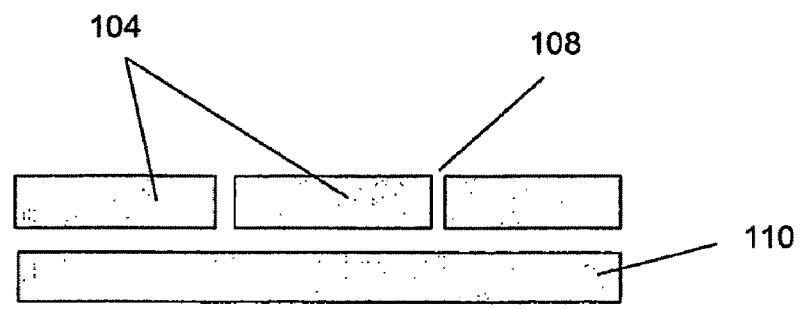
FIG. 1(b) is a schematic drawing of a cross-section of the device of FIG. 1(a) along line A-A.

A schematic drawing of a cross-section of the device 100 in FIG. 1(a) along a line A-A is shown in FIG. 1(b). An auxiliary magnet 110 is disposed on one side of the magnet elements 104 of the magnetic structure 102. The auxiliary magnet 110 helps to further increase an overall magnetic flux density of the magnetic field projected from the device 100 and also helps to further increase the intensity of magnetic interference created at the gaps 106 between the magnet elements 104. As the auxiliary magnet 110 is a single piece of magnetic structure, there is no magnetic interference emitted from the auxiliary magnet 110. As a result, the auxiliary magnet 110 acts as a shield element to substantially shield a magnetic interference field projected from the side of the magnet elements 104 facing the auxiliary magnet 110 from being emitted. The auxiliary magnet 110 can be in the form of a single piece of permanent magnet.

The magnetic material for forming the magnetic structure 102 and the auxiliary magnet 110 can be made of materials comprising, for example, ferrite, ceramics, samarium cobalt, or neodymium. The magnetic materials can either be polarized to the desired polarity before the magnetic structure 102 is formed or after the magnetic structure 102 is formed.

The intensity of magnetic interference created between the magnet elements 106 depends on several factors and can be generally represented by the following equation (i.e. Equation 1):

$$\text{Intensity of magnetic interference} = f(B_1^2, B_2^2, L, g^{-2}, D^{-2}) \quad (1)$$

where $B_1$ is the average magnetic flux density of the magnet elements (gauss);

$B_2$ is the magnetic flux density of the auxiliary magnet (gauss);

L is the total length of the boundary between the magnet elements (m);

g is the average gap distance between the magnet elements (m), where $g \neq 0$; and D is the perpendicular distance from a surface plane of the magnet elements (m).

From the above equation, it is observed that at a given perpendicular distance (D) from a surface plane of the magnet elements, the intensity of magnetic interference is proportional to the length of the boundary between the magnet elements (L) and the square of the average magnetic flux density ($B_1$) of the magnet elements and the square of the magnetic flux density ($B_2$) of the auxiliary magnet. However, the intensity of magnetic interference is inversely proportional to the square of the average gap (g) distance between the magnet elements.

Further, since the influence of the magnetic interference on the object to be treated (i.e. treatment effect) depends on the intensity of the magnetic interference whereby the more intense the magnetic interference (and therefore, the greater the strength of the magnetic field created by the magnetic interference), the greater the influence of the magnetic interference has on the object to be treated. Therefore, the above parameters, $B_1$, $B_2$, L, g, and D, are also factors affecting the treatment effect on the perishable objects (i.e. treatment effect=$f(B_1^2, B_2^2, L, g^{-2}, D^{-2})$).

Figure 2A:
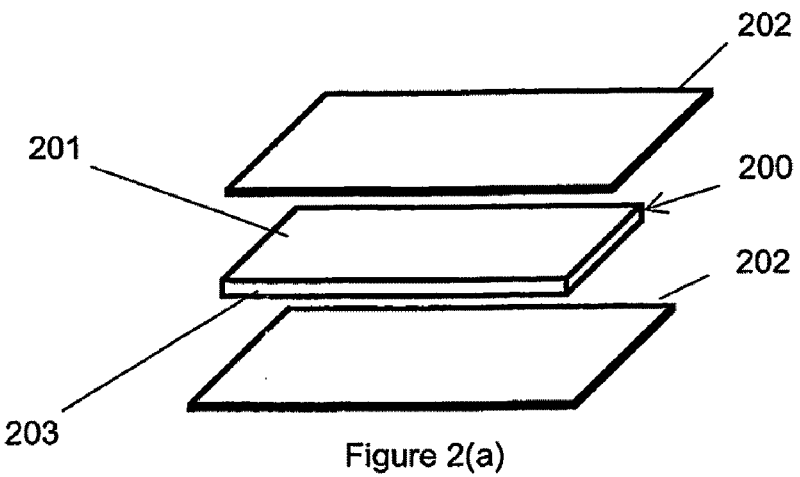
FIGS. 2(a) to 2(c) are schematic drawings showing a method of fabricating a device according to the embodiment.
Figure 2B:
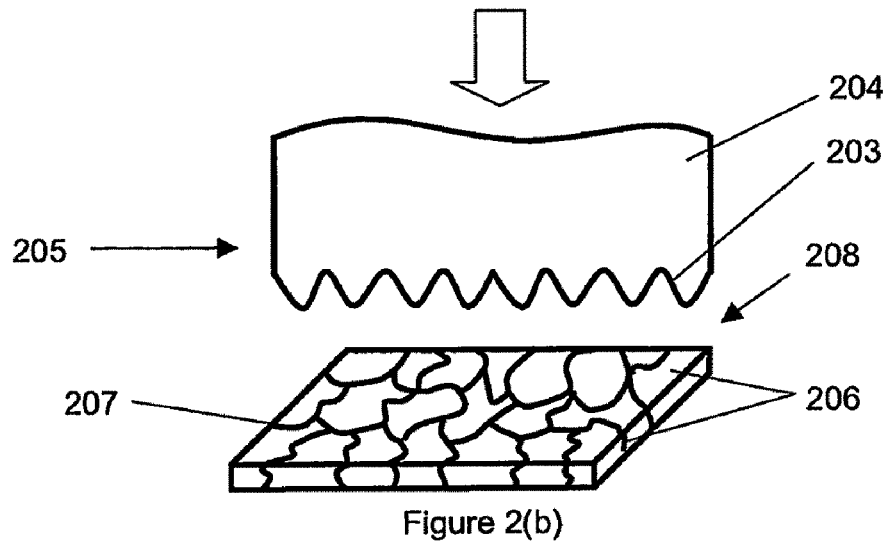

Schematic drawings of a method of fabricating a device 212 are shown in FIGS. 2(a) to 2(b). A fixture element in the form of two adhesive sheets 202 is attached onto a single piece of magnetic material 200. The piece of magnetic material 200 is disposed between the two adhesive sheets 202, as shown in FIG. 2(a). The adhesive sheets 202 are attached along opposing surfaces 201, 203 of the magnetic material 200.

The adhesive sheets 202 can comprise clear elastic adhesive sheets which are stretched and wound around the opposing surfaces 201, 203 of the magnetic material 200, thereby binding the magnetic material 200. As a result a compressive force is exerted on the magnetic material 200. However, it will be appreciated that other types of fixture elements can be used, as long as movement of the magnet elements 206 with respect to each other is inhibited.

A punch 204 is used to physically break the piece of magnetic material 200 into a plurality of smaller pieces of adjoining magnet elements 206, as shown in FIG. 2(b). The punch 204 comprises a plurality of protrusions 203 on a leading surface 205. The punch 204 is advanced towards the magnetic material 200 and applies a force onto the magnetic material 200 to break the magnetic material 200 into the plurality of adjoining magnet elements 206. The punch 204 is retracted after the piece of magnetic material 200 is broken. Therefore, a magnetic structure 208 comprising the plurality of adjoining magnet elements 206 is obtained. Movement of the magnet elements 206 with respect to each other during the breaking of the magnetic material 200 is inhibited by the adhesive sheets 202 wound around the piece of magnetic material 200. The magnetic structure 208 of FIG. 2(b) is generally similar to the magnetic structure 100 of FIG. 1. The magnetic structure 208 is rectangular in shape and is generally planar. It will be appreciated that the magnetic structure 208 can be of other shapes, e.g. square, circular, etc., depending on design requirements. Further, it will be appreciated that instead of having protrusions 203 on the leading surface, the punch 204 can have other geometries and configurations, as long as the punch can break the magnetic material 200 into a plurality of magnet elements 206.

The adhesive sheets 202 serve to inhibit movement of the magnet elements 206 with respect to each other by exerting a compressive force on the magnetic structure 208 to hold the magnet elements 206 in place with respect to each other, against any repulsive forces between the magnet elements 206. The magnet elements 206 are spaced adjacent to each other with a separation gap defining a boundary 207 between adjoining magnet elements 206 to produce a magnetic field created by magnetic interference of the magnets. Further, the adhesive sheets 202 should be sufficiently deformable such that the adhesive sheets 202 are not broken when force is applied by the punch 204 to break the piece of magnetic material 200. The adhesive sheets 202 can be, for example, cellophane tape or polyethylene tape. In the above description, two adhesive sheets 202 are used, however, it will be appreciated that a single adhesive sheet attached along at least one surface of the piece of magnetic material 200 as long as the plurality of magnet elements 206 can be held securely such that relative movement of the magnet elements 206 is inhibited, thereby maintaining small gaps between the adjoining magnet elements 206.

By keeping the plurality of magnet elements 206 adjacent to each other with small gaps between adjoining magnet elements 206, the magnetic interference created by the adjoining magnet elements 206 is intensified. Referring to Equation 1 (and assuming that all other factors, $B_1$, $B_2$, L and D are kept constant) it is observed that when the gap distance between adjoining magnet elements 206 is decreased, the intensity of the magnetic interference is increased as the magnetic interference intensity is inversely proportional to the square of the gap distance (g). Therefore, the gap distance between adjoining magnet elements 206 should be maintained as small as possible to achieve magnetic interference of a greater intensity.

Conventionally, due to repulsive forces between magnets, it is difficult to assemble or keep two magnets very close to one another, especially where high strength magnets are used. However, as described above, by utilising the fixture element on the piece of magnetic material 200 to inhibit movement of the plurality of magnet structures 206 with respect to each other to form the magnetic structure 208, results in the magnetic structure 208 having a plurality of magnet elements 206 which are held adjacent to one another such that the separation gaps between the magnet elements 206 can be kept small, for example, in the range of about 0.01 mm to about 2.00 mm. This creates a substantially intensified magnetic interference. The magnetic materials for forming the magnetic structure 208 can either be polarized to the desired polarity before the magnetic structure 208 is formed or after the magnetic structure 208 is formed.

Since increasing the intensity of magnetic interference increases the strength of the magnetic field, the size and/or the number of magnets required to achieve a desired magnetic field strength is reduced. This in turn can reduce the total weight and cost of the device.

Figure 2C:
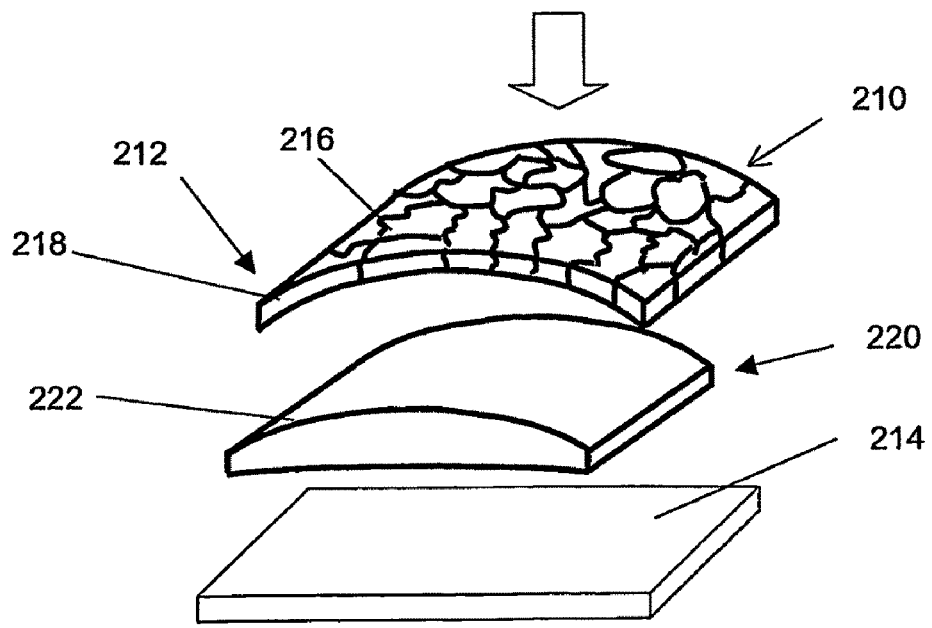

After breaking the piece of magnetic material 200, the generally planar magnetic structure 208 in FIG. 2(b) is formed into an arc-shaped magnetic structure 210, as shown in FIG. 2(c) while substantially maintaining a relative position of the magnet elements 206 with respect to each other. The generally planar magnetic structure 208 is placed against a support 220 having an arc-shaped profile 222 such that the generally planar magnetic structure 208 conforms to the arc-shaped profile 222 of the support 220 to form the arc-shaped magnetic structure 210. An adhesive sheet (not shown) is used to wrap the magnetic structure 210 against the support 220 to maintain the shape of the arc-shaped magnetic structure 210. It will be appreciated that the generally planar magnetic structure 208 can be formed into other desired shapes such as a dome shape instead of an arc shape by using a support with a corresponding profile shape. The support 220 can be made of any non-metallic material, such as plastic.

The device 212 comprises the arc-shaped magnetic structure 210 and a magnetic shielding device in the form of, for example, an auxiliary magnet 214 disposed on one side of the magnetic structure 210. As described earlier, the auxiliary magnet 214 comprises a single piece of magnetic material, therefore no magnetic interference is created by the auxiliary magnet 214, therefore, the auxiliary magnet is a shielding device for shielding the magnetic interference field projecting from at least one side of the magnetic structure 210. Further, the auxiliary magnet 214 also helps to increase the overall magnetic flux density and also helps to increase the magnetic interference created at the gaps between the magnet structures 206. The arc-shaped magnetic structure 210 comprises a convex side 216 and a concave side 218. In this embodiment, a south-pole side of the magnetic structure 210 is made the convex side 216 of the magnetic structure 210 and the north-pole side of the magnetic structure 210 is made the concave side 218 of the magnetic structure 210. The magnetic field (not shown) projecting from the convex side 216 of the magnetic structure 210 is projected onto the perishable object (not shown) to treat the object. Therefore, the object to be treated is exposed to a magnetically interfered south magnetic field. The auxiliary magnet 214 is disposed at the concave side 218 (i.e. north-pole side) of the magnetic structure 210 to shield the magnetic interference projecting from the north-pole side of the magnetic structure 210. The auxiliary magnet 214 is disposed with the same magnetic polarity orientation of the magnetic structure 210. Therefore, in this case, a south-pole side of the auxiliary magnet 214 faces towards the north-pole side of the magnetic structure 210. The auxiliary magnet 214 may be any kind of permanent magnet or may be made of magnetic materials.

The device 212 comprising the arc-shaped magnetic structure 210, the support 220 and the auxiliary magnet 214 are encapsulated in plastic resins, e.g. epoxy or polyester plastics to form, for example, a disc structure (not shown) for placing beneath perishable objects that are to be treated. Alternatively, the device 212 is incorporated, e.g. by encapsulating in plastic resins, into a vessel or container (not shown) that contains the perishable objects to be treated. FIGS. 6 to 10 show various examples of the device 212 being incorporated into, for example, a tray structure, a container, a coaster, etc. Alternatively, the device 212 can be encapsulated in a plastic casing, e.g. a polyethylene or polypropylene plastic casing. It will be appreciated that instead of forming the generally planar magnetic structure 208 into the arc-shaped magnetic structure 210, the auxiliary magnet 214 can be disposed on one side of the generally planar magnetic structure 208 (e.g. the north-pole side of the generally planar magnetic structure 208). The generally planar magnetic structure 208 and the auxiliary magnet 214 are then encapsulated in plastic resins or a plastic casing, or incorporated into a vessel or a container as described above.

It will be appreciated that if a north magnetic field is to be used to treat an object, the north-pole side of the magnetic structure is made the convex side and the south-pole side of the magnetic structure is made the concave side.

There are two polarities and directions in a magnetic field. One direction is from the North magnetic pole and the other direction is from the South magnetic pole. Based on scientific convention, the compass "north" needle points in the direction of the magnetic flux, that is, in an outward direction from a magnet's North pole end and inward at the magnet's South pole end.

Schematic drawings of another example method of fabricating a device 312 for treating perishable objects are shown in FIGS. 3(a) to 3(c). A single piece of magnetic material 300 that is generally flat and circular in shape, is used to form a magnetic structure 306 (FIG. 3(b)). An adhesive sheet (not shown) is attached along opposing surfaces of the piece of magnetic material 300 prior to breaking the piece of magnetic material 300 into a plurality of magnet elements 304. The adhesive sheet comprises clear plastic sheet that is wound or wrapped around the opposing surfaces of the magnetic material 300, thereby binding the magnetic material 300 and exerts a compressive force on the magnetic material 300. A punch 302 is used to break the piece of magnetic material 300 into the plurality of adjoining magnet elements 304, resulting in a generally planar magnetic structure 306, as shown in FIG. 3(b). Movement of the plurality of magnet elements 304 with respect to each other during breaking of the magnetic material 300 is inhibited by the adhesive sheet. The compressive force exerted on the magnetic material 300 acts against the repulsive forces between the magnet elements 304 so as to inhibit the movement of the magnet elements 304 with respect to each other. The generally planar magnetic structure 306 is formed into a dome-shaped magnetic structure 308 using a support 316 having a dome-shaped profile 318, as shown in FIG. 3(c). The magnetic materials can either be polarized to the desired polarity before the magnetic structure 308 is formed or after the magnetic structure 308 is formed. A circular shielding device in the form of an auxiliary magnet 310 disposed at a concave side 314 of the dome-shaped magnetic structure 308 to shield the magnetic interference field projecting from the concave side 314.

The device 312 comprising the dome-shaped magnetic structure 308, the support 316 and the auxiliary magnet 310 are encapsulated in plastic resins, e.g. epoxy or polyester plastics to form, for example, a disc structure (not shown) for placing beneath perishable objects that are to be treated. Alternatively, the device 312 is incorporated, e.g. by encapsulating in plastic resins, into a vessel or container (not shown) that contains the perishable objects to be treated. FIGS. 6 to 10 show various examples of the device 312 being incorporated into, for example, a tray structure, a container, a coaster, etc. Alternatively, the device 312 can be encapsulated in a plastic casing, e.g. a polyethylene or polypropylene plastic casing and sealed with a plastic resin. It will be appreciated that instead of forming the generally planar magnetic structure 306 into the dome-shaped magnetic structure 308, the auxiliary magnet 310 can be disposed on one side of the generally planar magnetic structure 306 (e.g. the north-pole side of the generally planar magnetic structure 208). The generally planar magnetic structure 308 and the auxiliary magnet 310 are then encapsulated with plastic resins or a plastic casing or incorporated into a vessel or a container as described above.

Figure 4A:
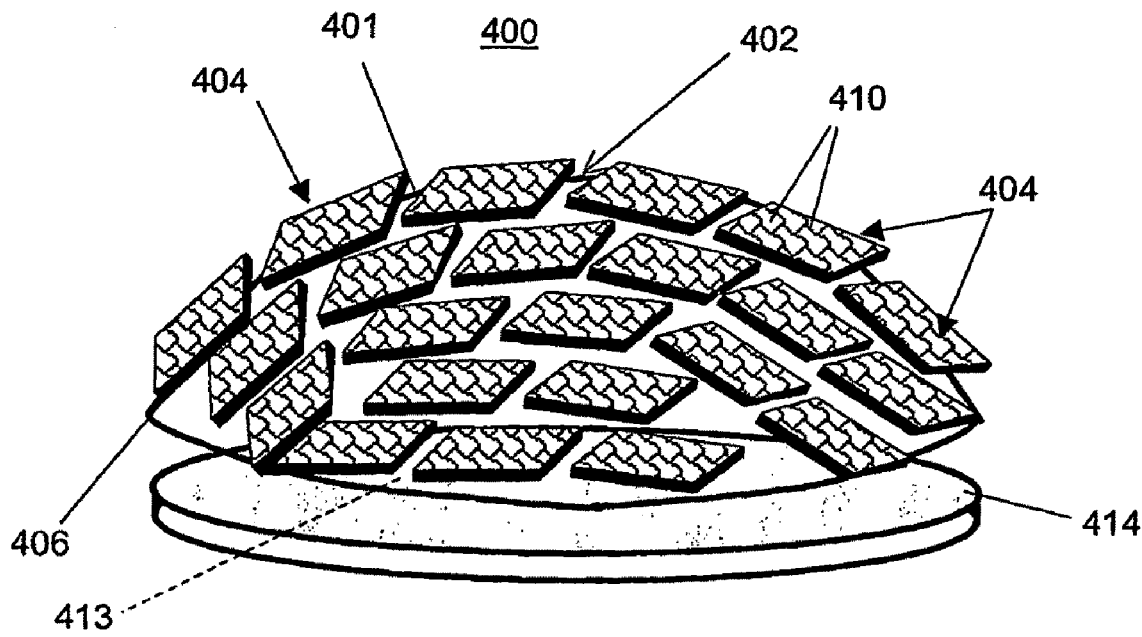
FIGS. 4(a) to 4(d) are schematic drawings showing different embodiments of a device.

A schematic drawing of a device 400 for treating perishable objects is shown in FIG. 4a. The device 400 comprises a dome-shaped support panel 402, a plurality of substantially planar magnetic structures 404 arranged on a convex side 401 of the dome-shaped support panel 402 and a base 414 disposed at the concave side 413 of the dome-shaped support panel 402. The magnetic structures 404 in this embodiment are similar to, for example, the magnetic structure 208 of FIG. 2(b). Each magnetic structure 404 comprises a set of magnet elements 210 formed from a single piece of magnetic material. An auxiliary magnet 406 is disposed on one side of each magnetic structure 404 to shield the magnetic interference field projecting from the side of the magnetic structure 404. The magnetic structures 404 and the auxiliary magnets 406 disposed on the support panel 402 are not individually encapsulated by plastic resins or a plastic casing in this embodiment. The auxiliary magnet 406 also helps to increase the overall magnetic flux density of the magnetic structure 404 and helps to increase the magnetic interference created at the gaps (not shown) between the magnet elements 410 of each magnetic structure 404. The magnetic structures 404 are arranged substantially in a staggered arrangement on the convex side 401 of the dome-shaped support panel 402 to produce further magnetic interference between the magnetic structures 404. This is in addition to the magnetic interference produced by the magnetic structures 404. In addition to the auxiliary magnets 406, the base 414 of the device 400 can also act as a shielding device. The base 414 can be made of metal, for example, aluminium or tin, to shield the magnetic interference field projecting form the concave side 413 of the support panel 402. Alternatively, the base 414 can comprise an auxiliary magnet to shield the magnetic interference field projecting from the concave side 413 of the support panel and also to help increase the overall magnetic flux density of the magnetic structure 404 and to increase the magnetic interference created at the gaps (not shown) between the magnet elements 410 of each magnetic structure 404, and also between each magnetic structure 404.

The device 400 comprising the magnetic structures 404, the auxiliary magnets 406, the support panel 402 and the base 414 are encapsulated in plastic resins, e.g. epoxy or polyester plastics, or plastics, e.g. polyethylene or polypropylene, to form, for example, a disc structure (not shown) for placing beneath perishable objects that are to be treated. Alternatively, the device 400 is incorporated, e.g. by encapsulating in plastic resins, in a vessel or container (not shown) that contains the perishable objects to be treated. FIGS. 6 to 10 show various examples of the device 400 being incorporated into, for example, a tray structure, a container, a coaster, etc.

Figure 4B:
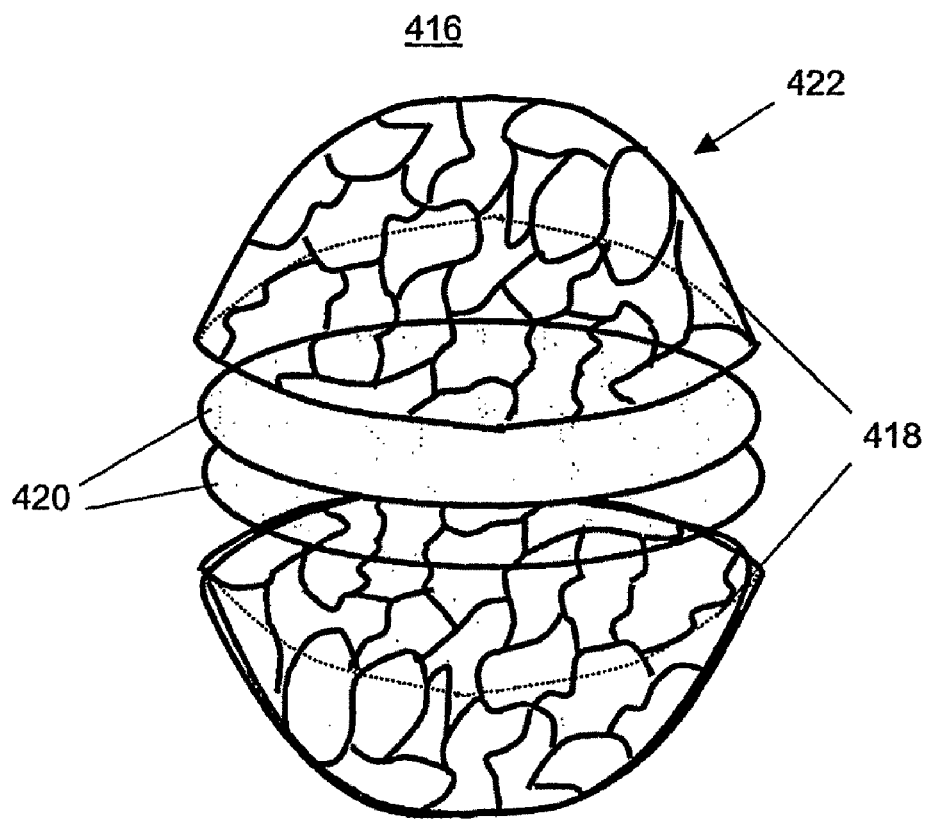

A schematic drawing of another example of the device 416 is shown in FIG. 4b. The device 416 comprises two dome-shaped magnet structures 418 arranged such that the respective auxiliary magnets 420 are contacting one another. One magnet structure 418 comprises the north magnetic field and the other magnet structure 418 comprises the south magnetic field. Therefore, the respective auxiliary magnets 420 have opposite magnetic polarity and attract each other, forming a globe shaped structure 422.

Figure 4C:
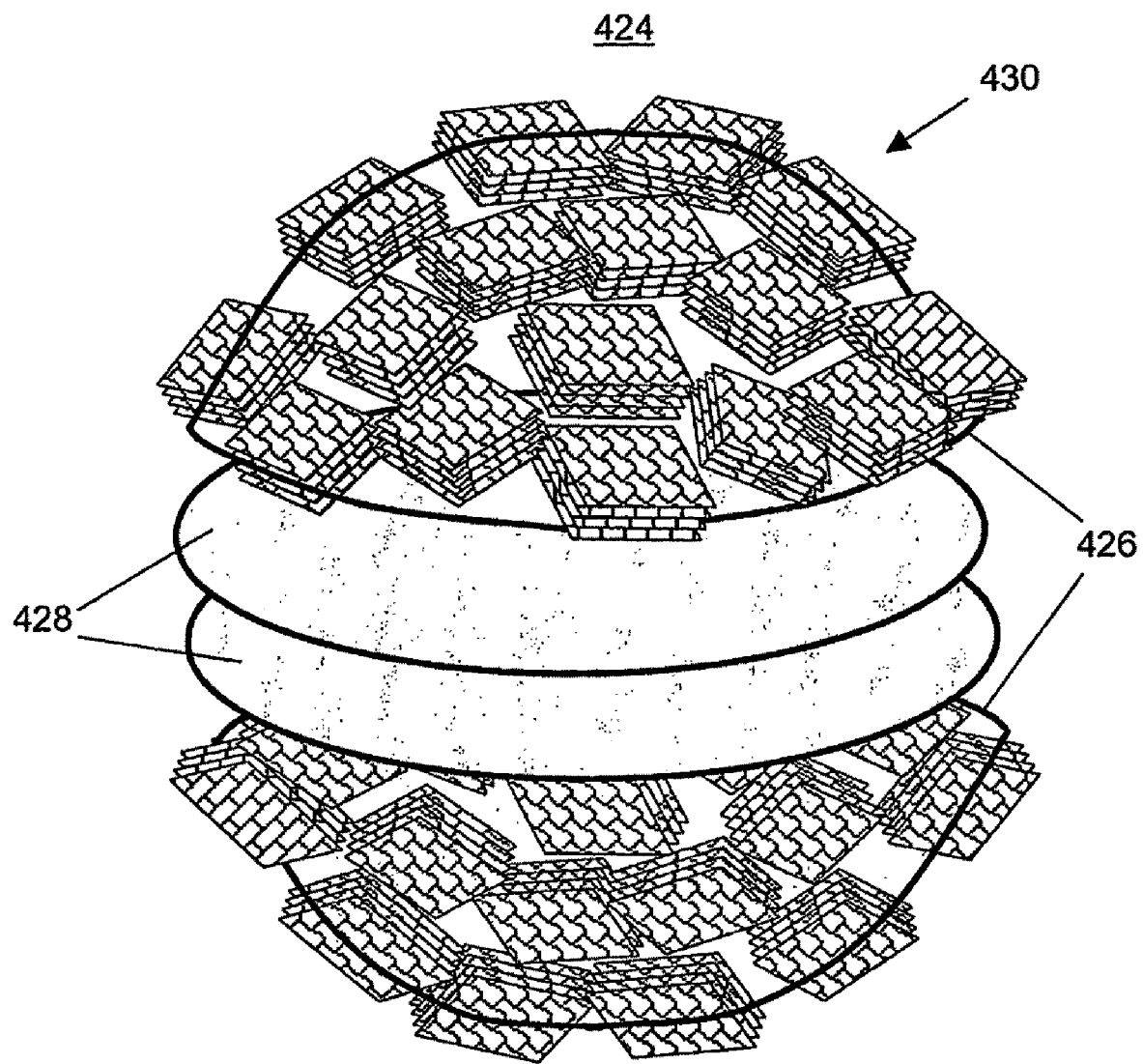

A schematic drawing of another example of the device 424 is shown in FIG. 4c. The device 424 comprises two dome-shaped magnet structures 426 similar to the device 400 of FIG. 4a. The two structures 426 are arranged such that the respective auxiliary magnets 428 are contacting one another. One magnet structure 426 comprises the north magnetic field and the other magnet structure 426 comprises the south magnetic field. Therefore, the respective auxiliary magnets 428 have opposite magnetic polarity and attract each other, forming a globe shaped structure 430.

Figure 4D:
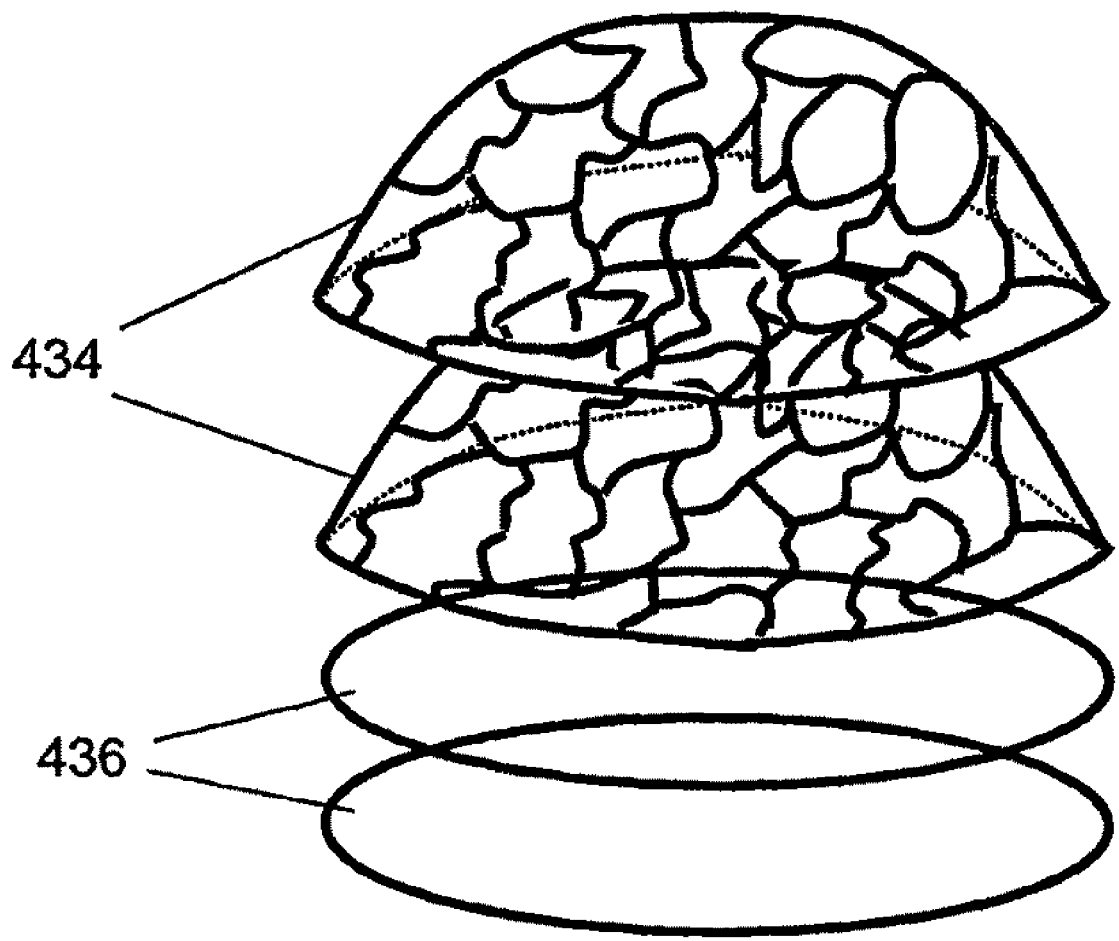

A schematic drawing of another example of the device 432 is shown in FIG. 4d. The device 432 comprises two dome-shaped magnet structures 434 stacked on one another. More than two dome-shaped magnet structures 434 can be stacked on another in different embodiments. The dome-shaped magnet structures 434 have the same polarity. The respective auxiliary magnets 436 of the magnet structures 434 are also stacked on one another to form the shield element. In other embodiments, a single piece of auxiliary magnet 436 can be used as the shield element. It will be appreciated that the magnet structures 434 can be also be of other configurations, e.g. in the form of the magnet structures 426 of FIG. 4(c). It will be appreciated that in different embodiments, the configuration could be a combination of the configurations described with reference to FIGS. 4(b) and (a).

Figure 5A:
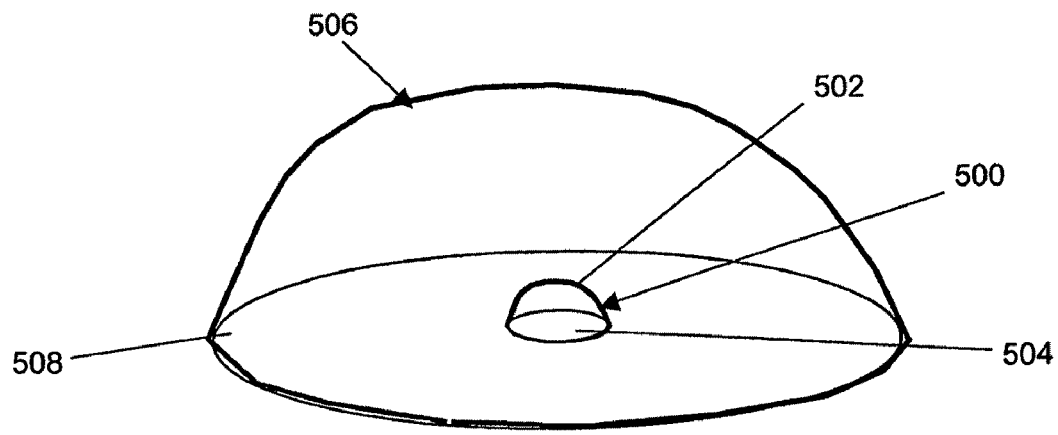
FIGS. 5(a) and 5(b) are schematic drawings showing respective aerial projections of magnetic fields of the devices according to the embodiments.

FIG. 5a shows a schematic perspective view of a device 500, for example, in the form of the device 312 of FIG. 3(c) or the device 400 of FIG. 4a. The device 504 comprises a dome-shaped portion 502 and a generally circular base 504. The shaded region in FIG. 5a shows an aerial projection of a magnetic field 506 created by magnetic interference, extending from the device 500. The aerial projection of the magnetic field 506 is dome-shaped with a circular base 508. The magnetic field 506 does not project from the base 504 of the device 500 due to the presence of a shielding device (e.g. the auxiliary magnet 310 of FIG. 3(c) or the auxiliary magnets 406 disposed beneath the magnetic structures 404 or the base 414 of the device 400 of FIG. 4a, which act as the shielding device).

Figure 5B:
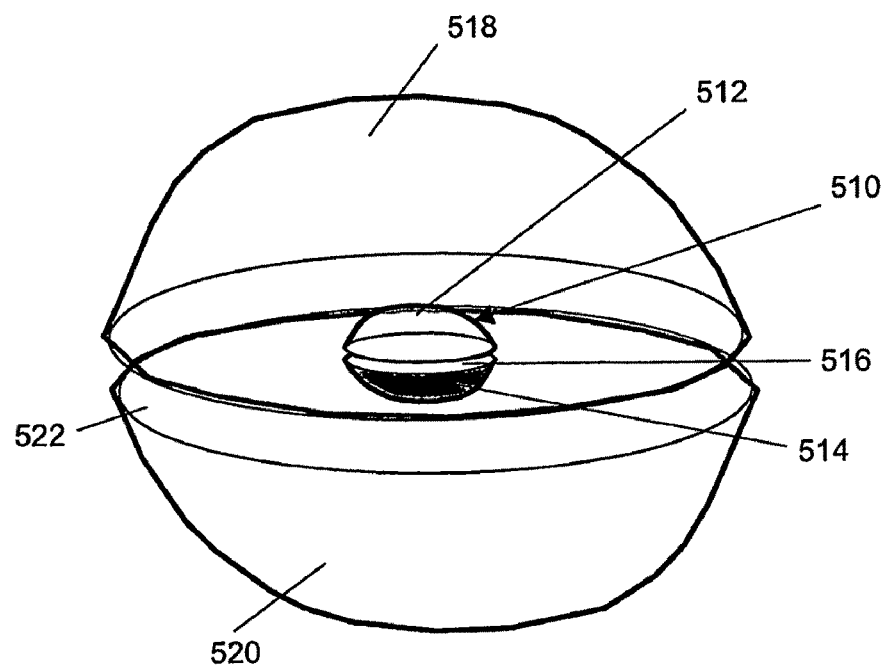

FIG. 5b shows a schematic perspective view of a globe-shaped device 510, for example, in the form of the device 416 of FIG. 4(b) or the device 424 of FIG. 4(c). The device 510 comprises two dome-shaped magnetic structures 512 and 514 and a generally circular base 516. The shaded region in FIG. 5b shows an aerial projection of a magnetic field 518 created by magnetic interference from one magnetic polarity, extending from the magnetic structure 512. The unshaded region in FIG. 5b shows another aerial projection of a magnetic field 520 created by magnetic interference from the opposite magnetic polarity, extending from the magnetic structure 514.

The aerial projections of the magnetic fields 518 and 520 are dome-shaped with a circular base 522. The magnetic fields 518 and 520 do not project from the base 516 of the structures 512 and 514 due to the presence of a shielding device (e.g. the auxiliary magnet 310 of FIG. 3(c) or the auxiliary magnets 406 disposed beneath the magnetic structures 404 or the base 414 of the device 400 of FIG. 4a, which act as the shielding device).

Objects to be treated should be exposed to the magnetically interfered magnetic field and therefore, should be positioned to be within the area of the magnetic field such that the magnetic field is directed onto the objects.

FIGS. 5a and 5b illustrates that by using the device 500 or 510, the magnetic field can be projected and diverged from the device 500 or 510, which can advantageously provide a larger treatment area compared to that achievable with a flat or planar magnetic structure of the same size.

Figure 6A:
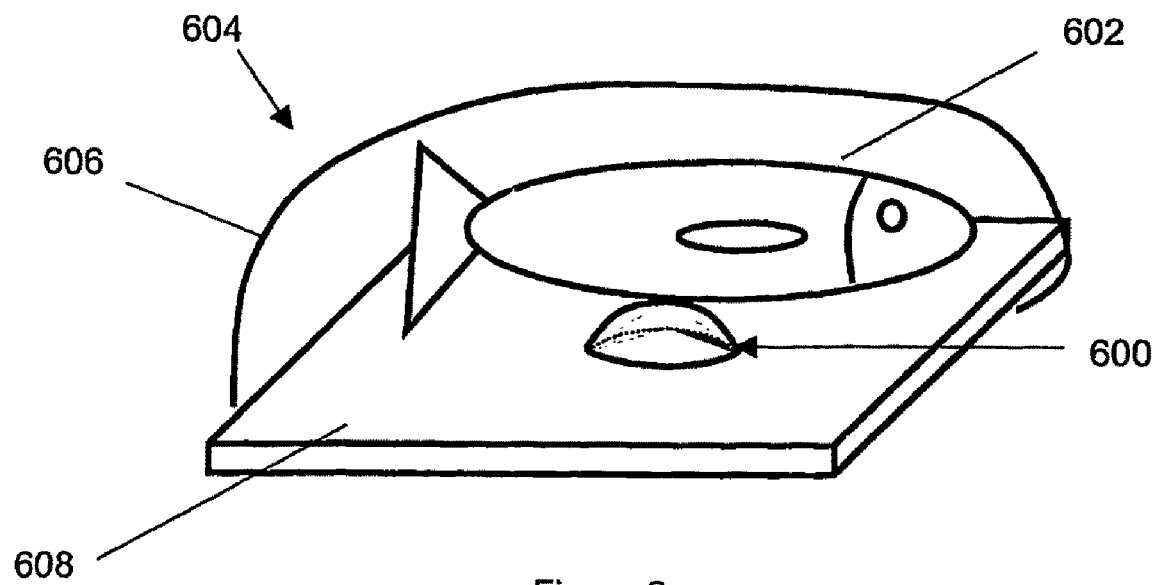
FIG. 6(a) is a schematic drawing showing the device according to the embodiments embedded into a tray component.

FIG. 6(a) shows a schematic drawing of a device 600, for example, in the form of the device 212 in FIG. 2(c), the device 312 in FIG. 3(c) or the device 400 in FIG. 4a. The device 600 is embedded into a tray component 608 by encapsulating the device 600 in plastic resins or in a plastic casing to form the tray component 608. The tray component 608 is placed below perishable objects to be treated, such as raw fish 602, or meat (not shown), in a package 604 for point-of-sale or storage purposes. The package 604 comprises a plastic sheet 606 wrapped over the tray 608, the device 600 and the raw fish 602. Alternatively, device 600 can be individually encapsulated in e.g. plastic resins, and placed on the tray component 608 rather than being embedded into the tray component 608.

Figure 6B:
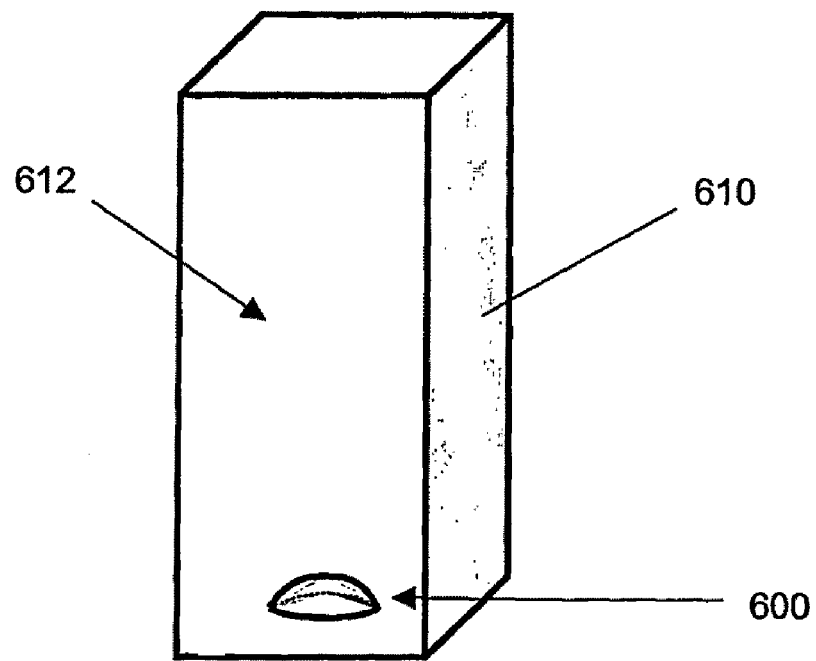
FIG. 6(b) is a schematic drawing showing the device according to the embodiments embedded into a beverage packaging.

FIG. 6(b) shows a schematic drawing of the device 600 embedded into a beverage packaging 610 by encapsulating the device 600 in plastic resins or in a plastic casing to form the beverage package 610. The beverage package 610 may store dairy products, such as milk or yogurt or fruit juices 612 for point-of-sale or storage purposes. The beverage package 610 may comprise a plastic container or paper box, the device 600 and the beverage 612. Alternatively, the device 600 can be individually encapsulated in e.g. plastic resins, and physically secured to the beverage packaging 610 rather than being embedded.

Figure 7:
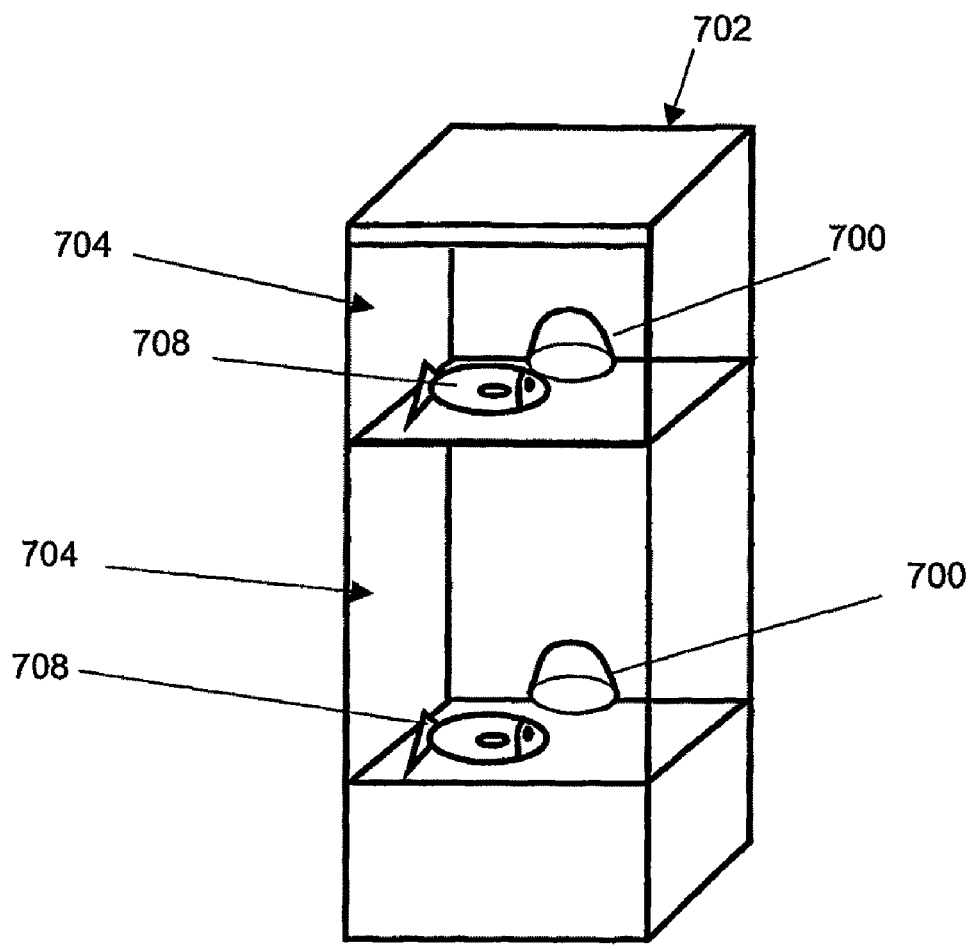
FIG. 7 is a schematic drawing showing the devices according to the embodiments embedded into compartments of a refrigerator.

FIG. 7 shows a schematic drawing of a device 700, for example, in the form of the device 212 in FIG. 2(c), the device 312 in FIG. 3(c) or the device 400 in FIG. 4a. Two devices 700 are placed in separate compartments 704 of a refrigerator 702. Each device 700 is embedded into one compartment 704 of the refrigerator by encapsulating the device 700 in plastic resins or in a plastic casing and to form the compartment 704. Perishable objects such as raw fish 708 are placed in the compartments 704 such that a magnetically interfered south magnetic field from the device 700 extends into the space of the compartment 704 containing the perishable objects to maintain freshness of the perishable objects. Alternatively, device 700 can be individually encapsulated in e.g. plastic resins, and placed in the compartments 704 rather than being embedded into the compartments 704.

Figure 8:
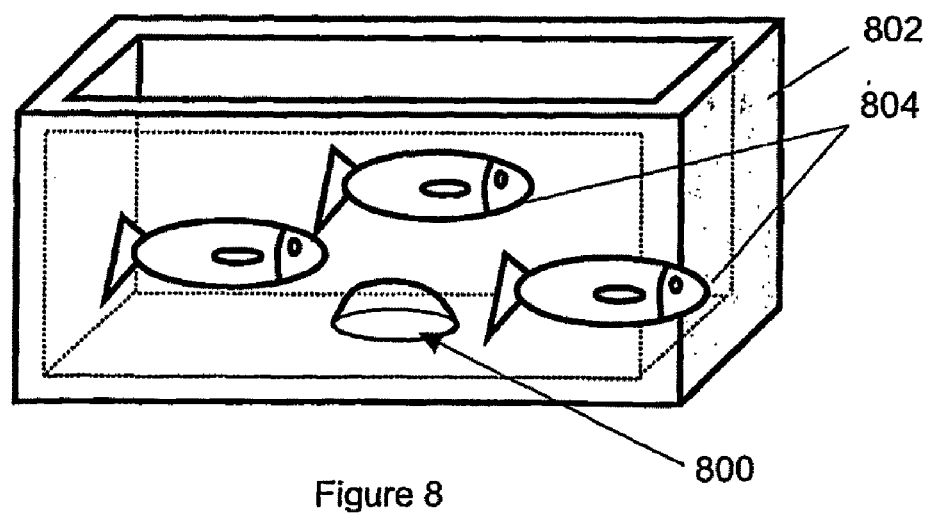
FIG. 8 is a schematic drawing of showing the device according to the embodiments embedded into a storage tank.

FIG. 8 is a schematic drawing of a device 800, for example, in the form of the device 212 in FIG. 2(c), the device 312 in FIG. 3(c) or the device 400 in FIG. 4a. The device 800 is embedded into a storage container 802 by encapsulating the device 800 in plastic resins or in a plastic casing to form the storage container 802. Perishable objects, such as raw fish 804 are placed in the storage container 802 to maintain the freshness of the perishable objects. Alternatively, device 800 can be individually encapsulated in e.g. plastic resins, and placed in the storage container 802 rather than being embedded into the storage container 802.

Figure 9A:
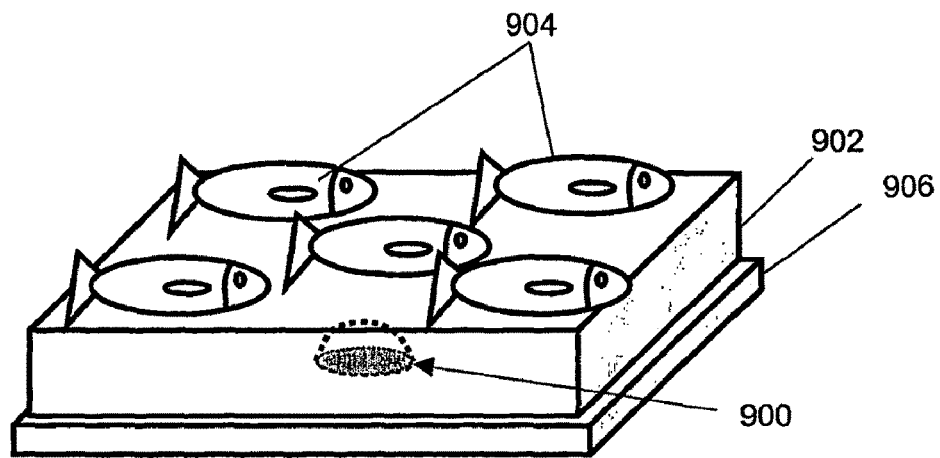
FIG. 9(a) is a schematic drawing showing the device according to the embodiments embedded into a tray component.

FIG. 9(a) is a schematic drawing of a device 900, for example, in the form of the device 212 in FIG. 2(c), the device 312 in FIG. 3(c) or the device 400 in FIG. 4a. The device 900 is embedded into a tray component 906 by encapsulating the device 900 in plastic resins or in a plastic casing to form the tray component 906. The tray 906 is placed below a block of ice 902. Perishable objects such as raw fish 904, are displayed on the block of ice 902. The device 900 is positioned such that the perishable objects are exposed to the magnetically interfered south magnetic field projecting from the device 900 to maintain the freshness of the perishable objects, and to slow the melting rate of the block of ice 902. Alternatively, device 900 can be individually encapsulated in e.g. plastic resins, and placed on the tray 906 rather than being embedded into the tray 906.

Figure 9B:
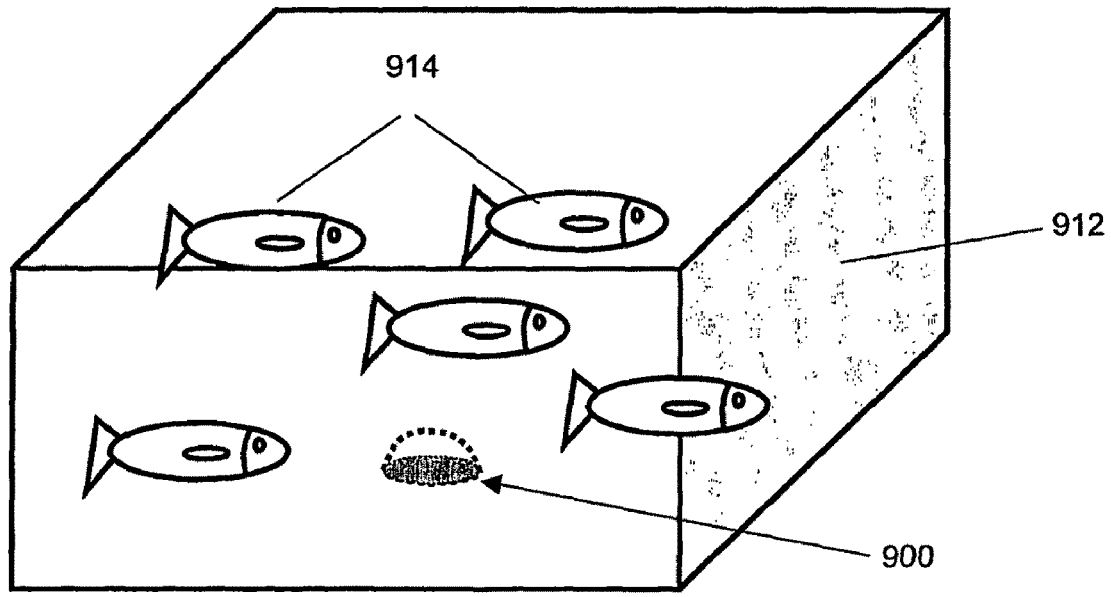
FIG. 9(b) is a schematic drawing showing the device according to the embodiments embedded into a large container.

FIG. 9(b) is a schematic drawing of the device 900 embedded into a large container 912 by encapsulating the device 900 in plastic resins or in a plastic casing to form the container 912. The device 900 is placed on the base of the container 912 which may be used in cold trucks and fishing trawlers. Perishable objects such as raw fish 914 are stored with or without ice in the container 912. The device 900 is positioned such that the perishable objects are exposed to the magnetically interfered south magnetic field projecting from the device 900 to maintain the freshness of the perishable objects. Alternatively, device 900 can be individually encapsulated in e.g. plastic resins, and placed on the container 912 rather than being embedded.

Figure 10:
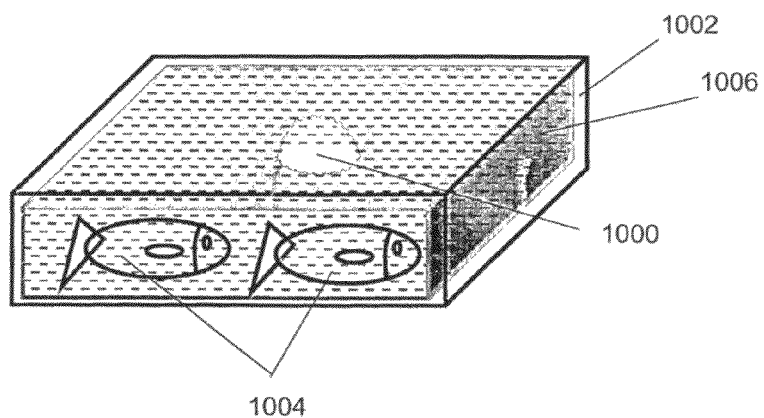
FIG. 10 is a schematic drawing showing the device according to the embodiments embedded into a container.

FIG. 10 is a schematic drawing of a device 1000, for example, in the form of the device 212 in FIG. 2(c), the device 312 in FIG. 3(c) or the device 400 in FIG. 4a. The device 1000 is embedded into a container 1002 by encapsulating the device 1000 in plastic resins or in a plastic casing to form the container 1002. The container 1002 is used in freezing perishable objects such as raw fish 1004. Water 1006 in the container 1002 containing the perishable objects and the device 1000 are frozen to maintain freshness of the perishable objects. In addition to keeping the perishable objects fresh. The magnetically interfered south magnetic field projecting from the device 1000 was found to increase the water binding strength in perishables and reduce water crystallisation and growth of water crystals that cause food cell damage in frozen food. Alternatively, device 1000 can be individually encapsulated in e.g. plastic resins, and placed into the container 1002 rather than being embedded into the container 1002.

Figure 11:
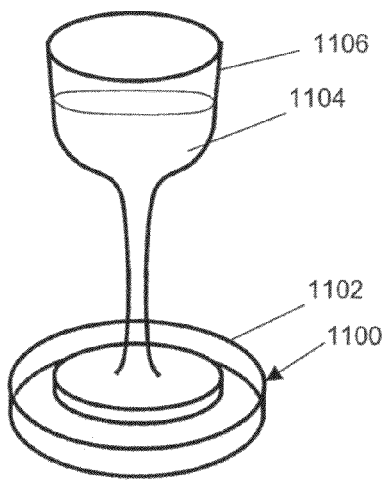
FIG. 11 is a schematic drawing showing the device according to the embodiments embedded into a coaster.

FIG. 11 is a schematic drawing of a device 1100, for example, in the form of the magnetic structure 208 of FIG. 2(b), the device 212 of FIG. 2(c), or the device 312 of FIG. 3(c) is embedded into a circular disc-shaped component 1102 by encapsulating the device 1100 in plastic resins or in a plastic casing to form a coaster 1102, for example, for wine 1104 contained in a glass 1106 or a bottle (not shown). The wine 1104 in the glass 1106 is exposed to the magnetically interfered north magnetic field projecting from the device 1100 and is therefore treated by the device 1100.

Figure 12:
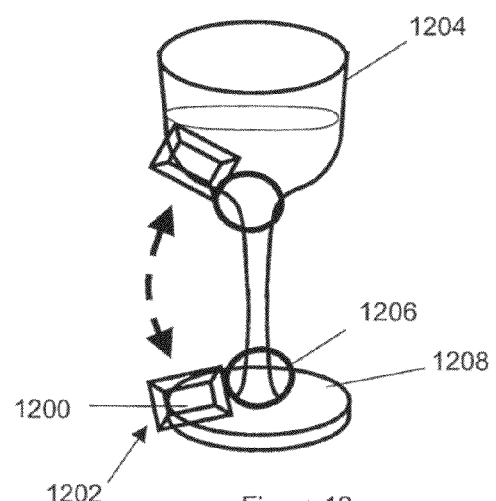
FIG. 12 is a schematic drawing showing the device according to the embodiments embedded into a pendant.

FIG. 12 is a schematic drawing of a device 1200, for example, be in the form of the magnetic structure 208 of FIG. 2(b) or the device 212 of FIG. 2(c) embedded into a rectangular-shaped enclosure 1202 by encapsulating the device in plastic resins or in a plastic casing to form a pendant 1202 for tagging to a beverage container such as a wine glass 1204. The pendant 1202 comprises a fastening means in the form of e.g. a string 1206 to allow the pendant to be movably attached to the wine glass 1204. The pendant 1200 can be moved from a rest position at the base 1208 of the wine glass 1204 to a lifted position to treat the wine in the wine glass 1204.

Figure 13E:
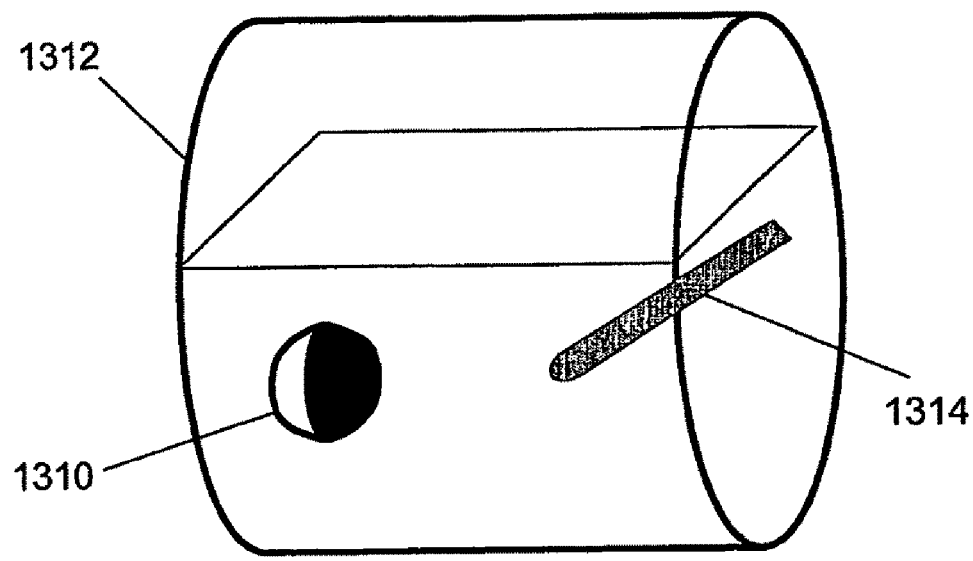
FIGS. 13(e) and 13(f) are schematic drawings showing the device according to the embodiments mounted in a storage tank container.

FIGS. 13(a) to (f) are schematic drawings of a device 1300 according to another embodiment. In this embodiment, the device 1300 is provided separately for use in treating perishable objects and liquids such as water. The device 1300 comprises a plurality of magnetic structures 1304 arranged in two rows along the length of a flexible support 1302. The magnetic structures 1304 can, for example, be in the form of the magnetic structure 208 in FIG. 2(b). Each magnetic structure 1304 comprises a set of magnet elements 1301 formed from a single piece of magnetic material. The magnetic structures 1304 in one row are disposed on the flexible support 1302 in an offset arrangement with respect to the magnetic structures 1304 in the other row. The flexible support 1302 carries the plurality of magnetic structures 1304 such that the device 1300 can be attached to objects with curved surfaces. FIG. 13(a) shows the device being wrapped around a conduit structure 1306 to treat the contents, for example, water, in the conduit 1306. A schematic drawing of a cross-section FIG. 13(a) along the line B-B is shown in FIG. 13(b). A magnetically interfered north magnetic field projected from the device 1300 treats the water by reducing the water molecule binding energy to improve water heating and cooling efficiency. Alternatively, the device 1300 can be wrapped around a cylindrical portion of a container 1308 as shown in FIG. 13(c). A schematic drawing of a cross-section of FIG. 13(c) along the line C-C is shown in FIG. 13(d). Each magnetic structure 1304 has an auxiliary magnet 1305 disposed on top of the magnetic structure 1304 (i.e. on the south pole side of the magnetic structure 1304). For illustration purposes, the magnetic structures 1304 disposed below the auxiliary magnet 1305 are shown in dashed lines in FIGS. 13(a) and 13(c). Additionally, a flexible shielding plate (e.g. aluminium foil, not shown) is disposed on top of the auxiliary magnet 1305 (i.e. on a side of the auxiliary magnet 1305 opposite the magnetic structure 1304). Each magnetic structure 1304 is first encapsulated in plastic resins, which is then assembled onto the flexible support 1302.

It will be appreciated that more than two rows or one row of magnetic structures 1304 can be attached to the flexible support 1302. Further, the magnetic structures 1308 can also be of other configurations, e.g. in the form of the device 212 of FIG. 2(c).

Figure 13F:
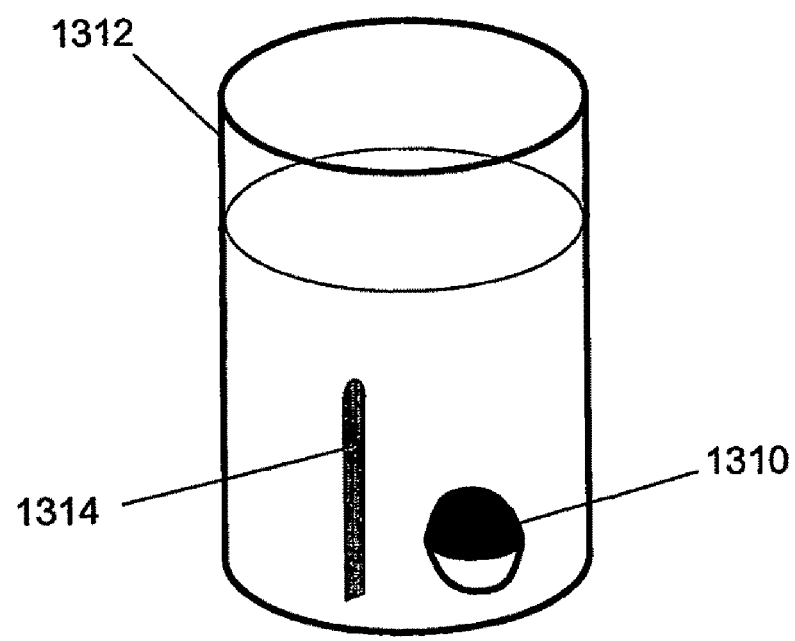

FIGS. 13(e) and 13(f) are schematic drawings of a device 1310, for example, in the form of the device 212 of FIG. 2(c), or the device 312 of FIG. 3(c), or the device 400 of FIG. 4(a), or the device 416 of FIG. 4(b), or the device 424 of FIG. 4(c), or device 432 of FIG. 4(d). The device 1310 is mounted in a storage tank container 1312 by encapsulating the device 1310 in plastic resins or in a plastic casing to form a waterproof and heat resistant device. An electric water heating element 1314 can be disposed in the storage tank container 1312.

Figure 14:
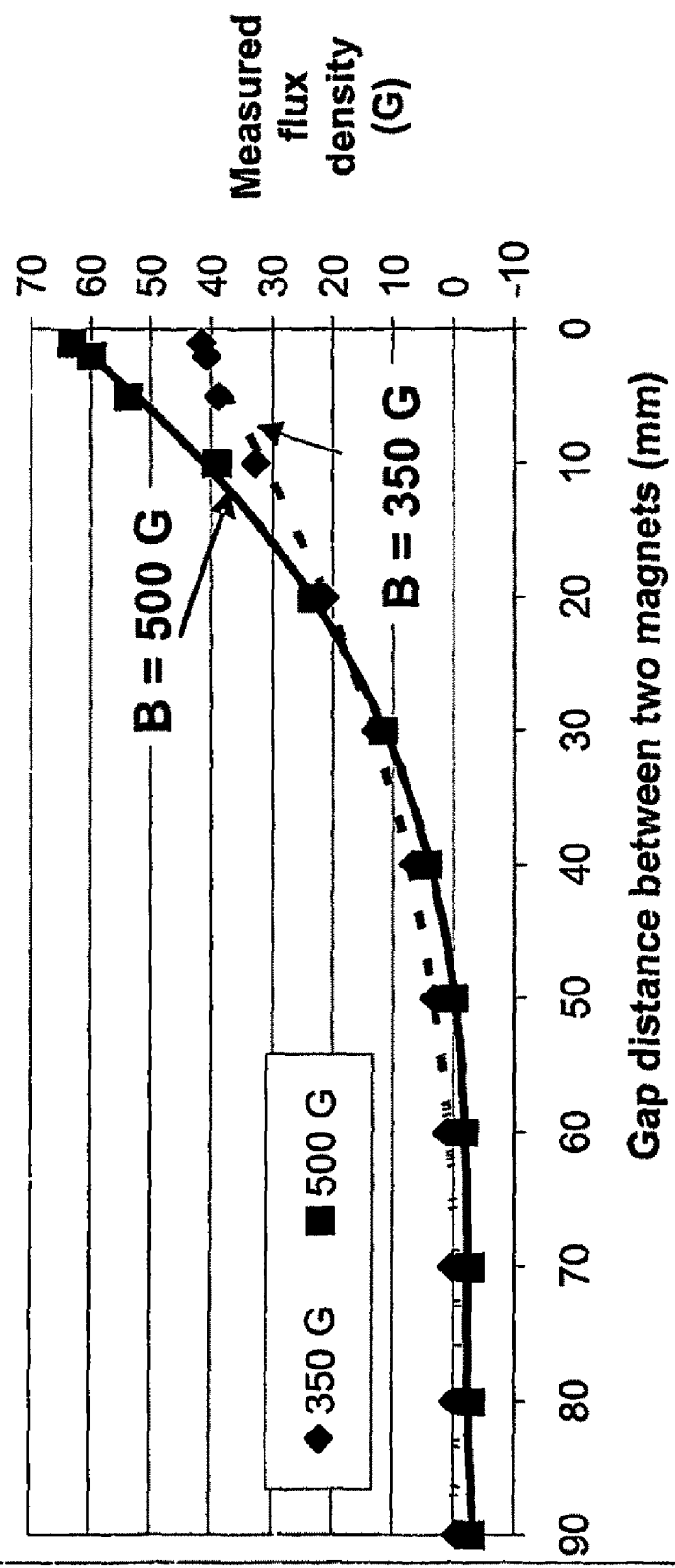
FIG. 14 is a graph based on experimental results of measure magnetic flux density against gap distance between two magnets.

FIG. 14 is a graph, based on experimental results, of gap distance between two magnets against measured magnetic flux density between the two magnets. The magnetic flux density of the pairs of magnets is measured at a perpendicular distance of about 25 mm away from the magnets' surface. Two pairs of permanent magnets were used for the experiments. Each pair of permanent magnets comprises two magnets that are of similar size and strength. Each of the magnets of the first pair has a magnetic flux (B) of about 350 G and each of the magnets of the second pair has a magnetic flux (B) of about 500 G. It is observed that for both pairs of magnets, when the gap distance between the two magnets of a pair decreases, the measured flux density of the magnetic field created by magnetic interference of the two magnets increases exponentially. Therefore, the smaller the gap distance between the magnets, the greater the intensity of the magnetic interference, which in turn increases the strength of the magnetic field. By using the method as described in the above embodiments, for example, with reference to FIGS. 2(a) to 2(c) or FIGS. 3(a) to 3(c), the gap distance between the adjoining magnet elements in the respective magnetic structures can be maintained small in order to create an intensified magnetic interference for treating perishable objects.

FIG. 15(a) is a table based on experimental results showing the average total bacteria count in three samples of raw sliced salmon after an exposure period of about 4.5 hours in room conditions at about 20° C. In the first sample, raw sliced salmon 1502 is placed on a device 1500, as shown in FIG. 15(b), and is exposed to a magnetically interfered south magnetic field projecting from the device 1500. The device 1500 is in the form of a plate 1504 comprising a plurality of magnetic structures 1508 disposed in a staggered arrangement in a base panel 1510 of the plate 1504. The magnetic structures 1508 can, for example, be in the form of the magnetic structures 208 in FIG. 2(*b*) or the magnetic structures 404 in FIG. 4*a*, each of the magnetic structures 404 having one auxiliary magnet 406 disposed on one side of the magnetic structure 406. In the second sample, raw sliced salmon 1502 is placed on the plate 1504 comprising a single magnet 1512 disposed in the base panel 1510 of the plate 1504, as shown in FIG. 15(*c*). The raw sliced salmon 1502 in the second sample is exposed to a south magnetic field projecting from the magnet 1512. The south magnetic field in the second sample is not created by magnetic interference. The strength of the magnets used in the first and sample are about 150±10 G. In the third sample, raw sliced salmon 1502 is placed on the plate 1504, as shown in FIG. 15(*d*) and is not subjected to any magnetic field. The total bacteria count (i.e. total plate count, TPC) of the first sample is about 16,400 cfu/g. However, the total bacterial count of the second sample and the third sample is about 87,000 cfu/g and about 49,000 cfu/g, respectively. The results in the table in FIG. 15(*a*) demonstrate that the magnetically interfered south magnetic field (having the lowest bacteria count out of the three samples) slows food spoilage compared to the second and third samples. On the other hand, the south magnetic field (without magnetic interference) appears to be the least effective of the three samples in slowing food spoilage.

FIG. 16 is a graph based on experimental results of ice bed thickness against duration of melting ice: (i) exposed to a device with a south magnetic interference field having an average magnetic flux density of about 250 G, (ii) exposed to another device with a south magnetic interference field having an average magnetic flux density of about 500 G, and (iii) not exposed to the device (i.e. not exposed to any magnetic field; magnetic interference field=0 G). Each bed of ice has a surface area of about 300×400 mm and is of about 60 mm thick at the beginning of the experiment. The ice beds are exposed for about 9 hours in room conditions at about 26° C. After 9 hours, the thickness of the ice bed not exposed to any magnetic field was about 2 mm thick. However, for the ice bed (ii), it is observed that the thickness of the ice bed after 9 hours is about 8 mm, thereby demonstrating that the rate of ice melting is reduced compared to the ice bed that was not subjected to any magnetic field. It is observed that for the ice bed (iii), the thickness of the ice bed after 9 hours is about 20 mm, thereby demonstrating that the rate of ice melting is reduced further. In other words, the results in the graph of FIG. 16 demonstrate that the rate of ice melting is reduced when the ice is exposed to the south magnetic interference field and a stronger south magnetic interference field slows the rate of ice melting further FIG. 17 is a graph based on experimental results showing thermal images of raw whole fish exposed to the device and raw whole fish not exposed to the device. Thermal infrared images of raw whole fish samples with time at various distances from the device were obtained and analysed. The fish samples were kept in room conditions at about 26° C. In this experiment, the device used is similar to the device of FIG. 3(*c*). A ferrite permanent magnet with a diameter of about 30 mm and a thickness of about 3 mm was used. The magnetic field strength of the permanent magnet is about 200 G. The permanent magnet is similar to for example, the magnetic structure 306 in FIG. 3(*b*). The fish exposed to the device were subjected to a magnetically interfered south magnetic field. Three sets of raw fish exposed to the device were placed at a distance of 0 cm, 15 cm and 30 cm, respectively, from the device, and thermal images of the fish from each set were obtained at time intervals of about 60 min, 120 min and 210 min from the beginning of the experiment. The raw fish not exposed to the device were not subjected to any magnetic field and are used as a reference or control experiment. Regions of darker shades in the thermal images represent areas of lower temperatures.

The thermal images show that the surface temperature of the raw fish nearest to the device (i.e. at 0 cm from the device) remained relatively cooler compared to the raw fish farther away from the device (i.e. at 15 cm and 30 cm from the device, respectively) and the raw fish that was not exposed to any magnetic field. After 210 mins, the thermal images of the fish samples at 30 cm away from the device was observed to be almost similar to the raw fish that was not exposed to the device. On the other hand, after 210 mins the fish samples that were placed at 0 cm and 15 cm away from the device, respectively still had relatively larger cooler regions compared to the fish samples at 30 cm away from the device. The fish samples at 0 cm away from the device have the largest cooler region compared to all of the other samples after 210 mins.

From the experimental results in FIG. 17 the maximum distance at which a perishable object can be placed in order to be treated by the device (i.e. effective distance) can be established and verified by thermal imaging, where other factors such as B, L and g of Equation 1 are kept constant.

Further, the fish samples closer to the device have an improved hydration state compared to the fish samples further away from the device and the fish samples that are not exposed to any magnetic field.

From the above experiment, the effective distance is about 30 cm away from the device. However it will be appreciated that the effective distance varies for devices of different shapes and interference magnetic field strengths.

FIGS. 18(*a*) and 18(*b*) are photographs of a block of ice 1802 exposed to the device 1800 and another block of ice 1804 not exposed to the device 1800, respectively. The block of ice 1802 that is exposed to the device 1800 is subjected to a magnetically interfered south magnetic field projected from the device 1800 (FIG. 18(*b*)) and the block of ice 1804 that is not exposed to the device 1800 is not subjected to any magnetic field (FIG. 18(*a*)). A schematic drawing of the device 1800 is superimposed onto the ice block 1802 for illustration purpose. The device 1800 can, for example, be in the form of the device 212 in FIG. 2(*c*), the device 312 in FIG. 3(*c*) or the device 400 in FIG. 4*a*. When water freezes, water crystals 1806 will grow, as shown in FIG. 18(*a*) and this phenomenon is detrimental to perishable objects such as food when water is frozen in the food because food cells will be damaged during ice crystallization growth period. The natural growth of water crystals 1806 without any magnetic interference field is shown in FIG. 18(*a*). When the block of ice 1802 is frozen in the presence of a south magnetic interference field from the device 1800, the rate at which water crystals 1808 are formed is reduced significantly, as shown by the smaller water crystals 1808 in FIG. 18(*b*). These results show that when exposed to the device 1800, perishables containing large amount of water have less ice re-crystallization growth problem when water freezes than those which are not exposed to the device 1800.

FIG. 19(*a*) is a graph based on experimental results demonstrating the effects of magnetic interference on water surface energy when a plurality of sessile water droplets are exposed to a magnetically interfered south magnetic field, a magnetically interfered north magnetic field and without any magnetic field, respectively. Contact angles of the sessile water droplets were plotted against various sample points. A schematic drawing showing a contact angle 1900 of a sessile water droplet 1902 on a surface 1904 is shown in FIG. 19(*b*). The contact angles of sessile water droplets on a solid plate exposed to the various conditions described above were measured. The horizontal bar in the graph represents the mean value of the contact angles measured. The data in the left region of the graph (sample number 1 to 11) shows the contact angles of the water droplets that were not exposed to any magnetic field. The mean contact angle for sample numbers 1 to 11 is about 86°. The data in the middle region of the graph shows the contact angles of water droplets after the water droplets (sample number 12 to 21) were exposed to the device (not shown) with an approximately 350 gauss—magnetically interfered north magnetic field disposed at about 150 mm away from the water droplets. The mean contact angle for sample numbers 12 to 21 is about 81.5°. The data in the right region of the graph shows the contact angles of water droplets after the water droplets (sample number 22 to 39) were exposed to the device (not shown) with an approximately 350 gauss—magnetically interfered south magnetic field disposed at about 150 mm away from the water droplets. The mean contact angle for sample numbers 22 to 39 is about 89°.

The above experimental results demonstrate that a magnetically interfered south magnetic field increases molecule bonding energy of liquids (e.g. water) such that the water droplets were able to retain their droplet shape better than the water droplets not exposed to any magnetic field, as shown by the larger contact angles of the water droplets exposed to the magnetically interfered south magnetic field. An increase in the molecule bonding energy indicates that the chance of water escaping from perishable objects will be lower (i.e. lower water activity) and hence water can be retained better as compared to, for example, perishable objects not exposed to any magnetic interference field, hence making the perishable objects firmer and fresher. In addition, an increase in molecule bonding energy reduces water activity and slows down the activity of enzymes and vitamins in foods. As a result, the denaturing of fats and proteins advantageously becomes slower. Hence the food colour, taste, and aroma can advantageously be retained better. Further, the increase in water bonding energy may slow down the melting rate of ice in an ice bed and bio-chemical activities such as oxidation in food.

On the other hand, the droplets exposed to the magnetically interfered north magnetic field have smaller contact angles compared to the water droplets that were not exposed to any magnetic field, which indicates that the molecule bonding energy in the water molecules have been weakened. A weakening of the molecule bonding energy has the opposite effect to increasing the molecules bonding energy, and can result in faster dehydration and oxidation of the perishable objects, and increasing the melting rate of ice (i.e. an increase in water activity). In addition, the weakened molecule bonds in liquids such as water, as demonstrated in the reduction of surface tension of water, can reduce the viscosity of water which may improve the heat transfer in a heating/boiling process such as the heat convection flow and the boiling process.

FIG. 20 is a graph based on experimental results showing thermal images of heat transfer in an open water storage tank exposed to the device and in an open water storage tank without the device respectively. The device can be installed either outside or inside a non-metallic storage tank. If the storage tank is made of metallic materials, the device is preferably installed inside the storage tank because metallic materials attenuate magnetic fields. In this experiment, the device used is similar to the device of FIG. 3(*c*). Other designs of the device, such as devices of FIGS. 4(*a*) to 4(*d*) can be used in other embodiments. The water is exposed to a magnetically interfered north magnetic field projecting from the device. The experimental results show that the water heating behaviour differed significantly between the tank with the device and the other tank without the device. With the device, it can be seen that the movement of heat from the heater source at the right side of the tank to the colder regions at the left side is more aggressive and faster than the other tank without the device. In addition, it can be observed that the heat movement spirals more prominently with the presence of the device than the one without the device.

To quantify the effect of the device on the overall heating improvement, the change in temperature was recorded after 60 minutes of heating by a 3 kilowatts heating element in an open storage water tank containing 153 litres of water. FIG. 21 shows a graph based on experimental results showed the effects of magnetic interference on water temperature rise when the water is exposed to a north-polarity device and when the water is not exposed to the device respectively. The experimental results show that the overall water temperature rise for the samples exposed to the device was statistically higher than the samples which are not exposed to the device by an average of about 7.6%.

From the experimental results shown in FIGS. 20 and 21, it can be observed that by exposing water to a magnetically interfered north magnetic field, the water is able to heat up faster and the transfer of the heat to the colder regions is also faster.

FIG. 22 shows a flowchart 2200 illustrating a method of fabricating the device for treating perishable objects or liquids. At step 2202, a single piece of magnetic material is broken into a plurality of pieces. At step 2204, movement of the pieces with respect to each other is inhibited during the breaking of the magnetic material. At step 2206, a magnetic structure comprising the pieces of the magnetic material is formed.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method of fabricating a device for treating perishable objects or liquids, the method comprising:
   breaking a single piece of magnetic material into a plurality of pieces;
   inhibiting movement of the pieces with respect to each other during the breaking of the magnetic material;
   forming a magnetic structure comprising the pieces of the magnetic material; and
   forming the magnetic structure into a desired shape while substantially maintaining a relative position of the pieces of the magnetic material with respect to each other,
   wherein the desired shape of the magnetic structure is substantially globe-shaped and comprises two dome-shaped or arc-shaped magnetic structures having opposite polarity.

2. A method of fabricating a device for treating perishable objects or liquids, the method comprising:
   breaking a single piece of magnetic material into a plurality of pieces;
   inhibiting movement of the pieces with respect to each other during the breaking of the magnetic material;

forming a magnetic structure comprising the pieces of the magnetic material; and forming the magnetic structure into a desired shape while substantially maintaining a relative position of the pieces of the magnetic material with respect to each other, wherein the magnetic structure comprises at least two dome-shaped or arc-shaped magnetic structures having a same polarity stacked on one another.

3. The method as claimed in claim 1, wherein inhibiting movement of the pieces comprises providing a fixture element on the magnetic material prior to breaking the magnetic material.

4. The method as claimed in claim 3, wherein the fixture element comprises at least one adhesive sheet attached along at least one surface of the magnetic material.

5. The method as claimed in claim 3, wherein the fixture element comprises two adhesive sheets attached along opposing surfaces of the magnetic material.

6. The method as claimed in claim 4, wherein the adhesive sheet is an elastic plastic sheet.

7. The method as claimed in claim 6, wherein the elastic plastic sheet is wound around the opposing surfaces of the magnetic material.

8. The method as claimed in claim 1, wherein the pieces of the magnetic material are initially unpolarized and are magnetically polarized after the desired shape of the magnetic structure is formed.

9. The method as claimed in claim 1, wherein forming the magnetic structure into the desired shape comprises:
providing a support having a profile with the desired shape;
attaching the magnetic structure to the support such that a shape of the magnetic structure conforms to the shape of the profile.

10. The method as claimed in claim 9, wherein attaching the magnetic structure to the support comprises wrapping the magnetic structure against the support with an adhesive sheet.

11. The method as claimed in claim 1, further comprising providing a shield element for shielding a north pole side or a south pole side of the magnetic structure.

12. The method as claimed in claim 11, wherein the shield element comprises at least one auxiliary magnet formed of a single piece of magnetic material.

13. The method as claimed in claim 12, wherein the auxiliary magnet is a permanent magnet or comprises magnetic material.

14. The method as claimed in claim 1, wherein the magnetic structure has a concave side and a convex side, further comprising providing an additional shield element on the concave side of the magnetic structure.

15. The method as claimed in claim 14, wherein the additional shield element is made from metal.

16. The method as claimed in claim 14, wherein the additional shield element comprises a single piece of magnetic material.

17. The method as claimed in claim 1, further comprising encapsulating the device in plastic resins or in a plastic casing.

18. The method as claimed in claim 5, wherein the adhesive sheet is an elastic plastic sheet.

19. The method as claimed in claim 8, wherein forming the magnetic structure into the desired shape comprises:
providing a support having a profile with the desired shape;
attaching the magnetic structure to the support such that a shape of the magnetic structure conforms to the shape of the profile.

20. The method as claimed in claim 2, wherein inhibiting movement of the pieces comprises providing a fixture element on the magnetic material prior to breaking the magnetic material.

21. The method as claimed in claim 20, wherein the fixture element comprises at least one adhesive sheet attached along at least one surface of the magnetic material.

22. The method as claimed in claim 20, wherein the fixture element comprises two adhesive sheets attached along opposing surfaces of the magnetic material.

23. The method as claimed in claim 21, wherein the adhesive sheet is an elastic plastic sheet.

24. The method as claimed in claim 23, wherein the elastic plastic sheet is wound around the opposing surfaces of the magnetic material.

25. The method as claimed in claim 2, wherein the pieces of the magnetic material are initially unpolarized and are magnetically polarized after the desired shape of the magnetic structure is formed.

26. The method as claimed in claim 2, wherein forming the magnetic structure into the desired shape comprises:
providing a support having a profile with the desired shape;
attaching the magnetic structure to the support such that a shape of the magnetic structure conforms to the shape of the profile.

27. The method as claimed in claim 26, wherein attaching the magnetic structure to the support comprises wrapping the magnetic structure against the support with an adhesive sheet.

28. The method as claimed in claim 2, further comprising providing a shield element for shielding a north pole side or a south pole side of the magnetic structure.

29. The method as claimed in claim 28, wherein the shield element comprises at least one auxiliary magnet formed of a single piece of magnetic material.

30. The method as claimed in claim 29, wherein the auxiliary magnet is a permanent magnet or comprises magnetic material.

31. The method as claimed in claim 2, wherein the magnetic structure has a concave side and a convex side, further comprising providing an additional shield element on the concave side of the magnetic structure.

32. The method as claimed in claim 31, wherein the additional shield element is made from metal.

33. The method as claimed in claim 31, wherein the additional shield element comprises a single piece of magnetic material.

34. The method as claimed in claim 2, further comprising encapsulating the device in plastic resins or in a plastic casing.

35. The method as claimed in claim 22, wherein the adhesive sheet is an elastic plastic sheet.

36. The method as claimed in claim 25, wherein forming the magnetic structure into the desired shape comprises:
providing a support having a profile with the desired shape;
attaching the magnetic structure to the support such that a shape of the magnetic structure conforms to the shape of the profile.

* * * * *